US008612276B1

(12) United States Patent
Nielsen et al.

(10) Patent No.: US 8,612,276 B1
(45) Date of Patent: Dec. 17, 2013

(54) METHODS, APPARATUS, AND SYSTEMS FOR DISPATCHING SERVICE TECHNICIANS

(75) Inventors: Steven Nielsen, North Palm Beach, FL (US); Curtis Chambers, Palm Beach Gardens, FL (US); Jeffrey Farr, Jupiter, FL (US); Rajdip Singh Sikand, Palm Beach Gardens, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 616 days.

(21) Appl. No.: 12/699,921

(22) Filed: Feb. 4, 2010

Related U.S. Application Data

(66) Substitute for application No. 61/220,491, filed on Jun. 25, 2009.

(60) Provisional application No. 61/151,824, filed on Feb. 11, 2009, provisional application No. 61/184,643, filed on Jun. 5, 2009.

(51) Int. Cl.
*G06Q 10/00* (2012.01)

(52) U.S. Cl.
USPC ........................................ 705/7.16; 705/7.22

(58) Field of Classification Search
USPC ................................. 705/7.16, 7.22
See application file for complete search history.

(56) References Cited

U.S. PATENT DOCUMENTS

| | | |
|---|---|---|
| 5,122,959 A | 6/1992 | Nathanson et al. |
| 5,566,291 A | 10/1996 | Boulton |
| 5,737,539 A | 4/1998 | Edelson et al. |
| 5,742,668 A | 4/1998 | Pepe et al. |
| 5,742,905 A | 4/1998 | Pepe et al. |
| 5,845,255 A | 12/1998 | Mayaud |
| 5,910,799 A | 6/1999 | Carpenter et al. |
| 5,913,201 A | 6/1999 | Kocur |
| 5,950,173 A | 9/1999 | Perkowski |
| 6,016,476 A | 1/2000 | Maes et al. |
| 6,049,776 A | 4/2000 | Donnelly et al. |
| 6,169,517 B1 | 1/2001 | Eslambolchi |
| 6,218,108 B1 | 4/2001 | LeVander |

(Continued)

OTHER PUBLICATIONS

360 Scheduling, 360 Concepts Guide 4.9.6 User Guide, 360 Technologies Ltd., Nottingham, UK, 2005-2008, 99 pages.

(Continued)

*Primary Examiner* — Peter Choi
*Assistant Examiner* — Nadja Chong Cruz

(57) ABSTRACT

Scheduling of activities for field service technicians may be improved by modifying availability constraints associated with appointment windows for activities. Activities may be scheduled based on a performance deadline and relevant shift times of the resources to whom the activity may be allocated, as well as a variety of parameters relating to activities, resources and/or relevant environmental conditions (e.g., weather, traffic). An activity may be moved from one calendar day to another, a location constraint at the beginning and/or the end of a technician's shift may be removed or modified, and/or information updates may be provided in real time or near real time (e.g., every five minutes or less) throughout a work day to facilitate scheduling. In one example for scheduling dispatch of locate technicians for locate operations, ticket information relating to locate request tickets, as well as resource information relating to available technicians, may be extracted from a ticket database and a resource/technician database to provide appropriate inputs to a scheduling engine, based at least in part on matching available resources to performance deadlines associated with locate requests.

45 Claims, 16 Drawing Sheets

(56) References Cited

U.S. PATENT DOCUMENTS

| | | |
|---|---|---|
| 6,219,054 B1 | 4/2001 | Komoda et al. |
| 6,236,977 B1 | 5/2001 | Verba et al. |
| 6,236,978 B1 | 5/2001 | Tuzhilin |
| 6,253,206 B1 | 6/2001 | Burton et al. |
| 6,266,659 B1 | 7/2001 | Nadkarni |
| 6,269,369 B1 | 7/2001 | Robertson |
| 6,272,429 B1 | 8/2001 | Dansby |
| 6,275,812 B1 | 8/2001 | Haq |
| 6,275,863 B1 | 8/2001 | Leff |
| 6,285,916 B1 | 9/2001 | Kadaba |
| 6,292,830 B1 | 9/2001 | Taylor |
| 6,314,089 B1 | 11/2001 | Szlam et al. |
| 6,430,496 B1 | 8/2002 | Smith et al. |
| 6,578,005 B1 | 6/2003 | Lesaint et al. |
| 6,587,851 B1 | 7/2003 | Ditcharo |
| 6,606,557 B2 | 8/2003 | Kotzin |
| 6,735,293 B2 | 5/2004 | Doherty et al. |
| 6,754,582 B1 | 6/2004 | Smith et al. |
| 6,937,853 B2 | 8/2005 | Hall |
| 6,958,690 B1 | 10/2005 | Asher et al. |
| 6,981,001 B1 | 12/2005 | Reddick et al. |
| 6,990,458 B2 | 1/2006 | Harrison et al. |
| 7,346,531 B2 | 3/2008 | Jacobs |
| 7,363,126 B1 | 4/2008 | Zhong et al. |
| 7,457,762 B2 | 11/2008 | Wetzer et al. |
| 7,464,046 B2 | 12/2008 | Wilson et al. |
| 7,472,181 B2 | 12/2008 | Hollinger et al. |
| 7,487,106 B2 | 2/2009 | Levine et al. |
| 7,640,105 B2 | 12/2009 | Nielsen et al. |
| 7,783,507 B2 | 8/2010 | Schick |
| 8,060,304 B2 | 11/2011 | Nielsen et al. |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 2001/0022837 A1 | 9/2001 | Vasell et al. |
| 2001/0032149 A1 | 10/2001 | Fujihara |
| 2001/0032154 A1 | 10/2001 | Schummer |
| 2002/0004725 A1* | 1/2002 | Martin et al. ............ 705/2 |
| 2002/0010615 A1* | 1/2002 | Jacobs .................... 705/9 |
| 2002/0065700 A1* | 5/2002 | Powell et al. ........... 705/9 |
| 2002/0072808 A1 | 6/2002 | Li |
| 2002/0077876 A1 | 6/2002 | O'Meara et al. |
| 2002/0087220 A1 | 7/2002 | Tveit et al. |
| 2002/0123864 A1 | 9/2002 | Eryurek et al. |
| 2002/0156692 A1 | 10/2002 | Squeglia et al. |
| 2003/0040826 A1 | 2/2003 | Hawman et al. |
| 2003/0055666 A1 | 3/2003 | Roddy |
| 2003/0130820 A1 | 7/2003 | Lane, III |
| 2003/0134599 A1 | 7/2003 | Pangrac et al. |
| 2004/0059588 A1* | 3/2004 | Burritt et al. ........... 705/1 |
| 2004/0062359 A1 | 4/2004 | Jones et al. |
| 2004/0111313 A1 | 6/2004 | Ingman et al. |
| 2005/0094772 A1 | 5/2005 | Harrison et al. |
| 2006/0031110 A1 | 2/2006 | Benbassat et al. |
| 2006/0178812 A1 | 8/2006 | Affleck et al. |
| 2006/0217876 A1 | 9/2006 | Houri et al. |
| 2006/0282280 A1* | 12/2006 | Stotz et al. ............. 705/1 |
| 2008/0162242 A1 | 7/2008 | Schneur et al. |
| 2008/0167911 A1 | 7/2008 | Hatakeda |
| 2008/0288267 A1* | 11/2008 | Asher et al. ............. 705/1 |
| 2009/0013928 A1 | 1/2009 | Nielsen et al. |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0237408 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |

(56) References Cited

U.S. PATENT DOCUMENTS

| | | |
|---|---|---|
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |

OTHER PUBLICATIONS

360 Scheduling, 360 Operations Guide 4.9.6 User Guide, 360 Technologies Ltd., Nottingham, UK, 2005-2008, 46 pages.

360 Scheduling, 360 Schema Interface 4.9.6 User Guide, 360 Technologies Ltd., Nottingham, UK, 2005-2008, 257 pages.

GPS Technology Enhancing Underground Utility Locating, Underground Construction Magazine, Apr. 7, 2010, 4 pages, http://www.undergroundconstructionmagazine.com/print/1034?page=show.

Muller et al., "A Simulation-Based Work Order Release Mechanism for a Flexible Manufacturing System," Dec. 1990, IEEE Article, pp. 599-602.

Sasaki et al., "Development of 'Intelligent WorkFlow System' Using Know-how Acquired Based on Work Order," Dec. 1997, IEEE, pp. 430-437.

* cited by examiner

FIG. 4A

METHODS, APPARATUS, AND SYSTEMS FOR DISPATCHING SERVICE TECHNICIANS

CROSS-REFERENCES TO RELATED APPLICATIONS

This application claims a priority benefit, under 35 U.S.C. §119(e), to U.S. Provisional Patent Application No. 61/151,824, filed on Feb. 11, 2009, entitled "Methods and Apparatus for Dynamic Dispatch of Service Technicians."

This application also claims a priority benefit, under 35 U.S.C. §119(e), to U.S. Provisional Patent Application No. 61/184,643, filed on Jun. 5, 2009, entitled "Methods and Apparatus for Dispatching Service Technicians."

This application also claims a priority benefit, under 35 U.S.C. §119(e), to U.S. Provisional Patent Application No. 61/220,491, filed Jun. 25, 2009, entitled, "Methods and Apparatus for Assessing Field Service Operation Tickets."

Each of these applications is incorporated herein by reference in its entirety.

BACKGROUND

Field service applications may be any application in which companies dispatch technicians and/or other staff to remote locations in order to perform certain activities, for example, installations, services and/or repairs. Field service applications may exist in industries, such as, but not limited to, network installations, utility installations, security systems, construction, medical equipment, heating, ventilating and air conditioning (HVAC) and the like.

I. Locate Operations

An example of a field service application in the construction industry is a so-called "locate operation" (sometimes also referred to as a "locate and marking operation"), in which a locate technician visits a work site to determine a presence or an absence of one or more underground facilities (such as various types of utility cables and pipes) in a dig area to be excavated or disturbed, and marks the presence or the absence of facilities in and/or in proximity to the dig area. In some states and municipalities, an excavator is required by law to notify any potentially affected underground facility owners prior to undertaking an excavation activity. This notice may be served by contacting a "one-call center," which may be a non-profit service operated by a consortium of underground facility owners, and by providing to the one-call center a description of the planned dig area.

FIG. 1 illustrates an example in which a locate operation is initiated as a result of an excavator 110 providing an excavation notice to a one-call center 120 (e.g., via an electronic mail message, a web entry, or a telephone conversation between the excavator 110 and a human operator at the one-call center 120). The excavation notice may include an address at which the excavation is to be performed and a description of the dig area, such as its location relative to certain landmarks and/or its approximate dimensions. Based on this information, and any additional information the one-call center 120 may have access to (e.g., existing maps of underground facilities and/or "polygon maps" that show buffer zones around underground facilities), the one-call center 120 creates a locate request ticket (also known as a "locate ticket," or simply a "ticket") and sends the ticket to one or more locate service providers 130. The one-call center 120 may additionally send the ticket to one or more underground facility owners 140, so that the underground facility owners 140 may perform audits on the locate service providers 130.

Alternatively, an underground facility owner 140 may operate its own fleet of locate technicians (e.g., locate technician 145), in which case the one-call center 120 may send the ticket to the underground facility owner 140 but not the locate service providers 130.

Upon receiving the locate request ticket, a locate service provider 130 may dispatch a locate technician 150 to the dig area to determine and/or mark a presence or absence of one or more underground facilities. This activity typically is referred to as a locate and marking operation (or simply a "locate") during which the technician locates and marks any underground facilities that are found in the dig area. The locate technician 150 may use an underground facility locate device for detecting the presence or absence of facilities that are concealed in some manner, such as cables and pipes that are buried underground. For example, the underground facility locate device may detect changes in an electromagnetic fields that may indicate the presence of an underground facility. Once an underground facility is detected, the locate technician may mark the presence of the facility by some type of marker; for example, the technician may use a marking device to dispense a marking material (e.g., paint, chalk or dye) on the surface of the ground to indicate the location of the detected underground facility. In some cases, the technician also may provide one or more marks to indicate that no facility was found in the dig area (sometimes referred to as a "clear").

The locate service provider 130 may handle a high volume of locate request tickets on a daily basis. For example, the locate service provider 130 may have locate offices (or profit centers) in different geographical regions and each locate office may have a hundred or more locate technicians in the field each day. Depending on its size, each locate office may respond to hundreds or even thousands of locate request tickets on a given day.

Conventionally, incoming locate request tickets are dispatched (or various information derived from such tickets is dispatched) to individual locate technicians based on geography. For example, the geographical region (e.g., a county) for which a locate office is responsible may be further divided into smaller geographical areas (e.g., cities or neighborhoods), and each geographical area may be assigned to a locate technician. Incoming locate request tickets are then assigned/allocated to different locate technicians based on the geographical areas in which the dig areas fall.

Throughout a work day, each locate technician maintains a list of outstanding activities to be performed on that day, based on the tickets assigned to the technician. The locate technician is responsible for scheduling and/or routing the outstanding activities. This is done conventionally in an ad hoc manner by the locate technician, for example, by manual inspection of the relative locations of the outstanding activities.

II. 360 Dynamic Scheduling Engine

More sophisticated scheduling and routing techniques have been employed in some other field service applications, such as appliance repair, utility installation and meter reading. For example, software applications have been adopted in these applications to facilitate the scheduling of field service activities performed by mobile technicians. One such application is the 360 Dynamic Scheduling Engine (also referred to simply as "360 DSE"). 360 DSE is a software application platform available from 360 Scheduling, Strelley Hall, Main Street, Strelley, Nottingham, NG8 6PE, United Kingdom (more information available at http://www.360scheduling.com). Several features of 360 DSE are summarized below, while further details can be found in "360

Concepts Guide 4.9.6, User Guide," which is incorporated herein by reference. For purposes of the present disclosure, an "engine" (e.g., a "scheduling engine") refers generally to a computing device (e.g., which may include one or more processors, memory, user interface, display, communications interface, signal and/or data input/output interface(s), etc.) executing one or more applications (e.g., software, computer-executable code, etc.) to perform some particular functionality as encoded in the application(s).

At a high level, 360 DSE receives as input a set of information relating to activities to be performed and resources available (e.g., technicians) for performing those activities. The output of 360 DSE is a schedule (or a plan) that indicates what is to be done, when, by whom and in some instances with what equipment. For example, the input information may include various constraints associated with the activities, such as location, timing and/or technician skill level requirements. The input information may also include constraints associated with the resources, such as available shift times and/or skill levels. Additionally, the input information may include revenue generated by the activities and costs associated with performing the activities, such as travel and/or overtime costs. Given the input information, 360 DSE attempts to search for a plan that satisfies all of the constraints and maximizes overall value (e.g., overall profit given by total revenue less total cost). In other words, 360 DSE attempts to solve an optimization problem against the value metric, where the optimization problem is parameterized by the input constraints.

In many cases, the output of 360 DSE may not be a strictly optimal plan, because the amount of computation required to search for a strictly optimal plan may be prohibitively large. Instead, 360 DSE aims to produce a "good" plan relatively quickly. For example, the plan returned by 360 DSE may be a best plan that 360 DSE is able to construct with respect to the value metric within a given amount of time. Along with the plan, 360 DSE may return a plan quality score on a scale from 0 to 100. This quality score may be calculated mathematically based on the search leading to the plan and may reflect a relative confidence level that the plan is indeed a best plan. Hereafter, the terms "optimized schedule" or "optimized plan" are used to refer broadly to any result produced by a software application for scheduling activities, such as 360 DSE.

FIG. 2 illustrates an example of a conventional application of 360 DSE. In this example, a number of activities 210A, 210B, . . . , are to be scheduled by 360 DSE (shown in FIG. 2 as component 220). Various information regarding each activity is provided to 360 DSE, such as an expected duration, a location, an availability period and a service level agreement (hereafter "SLA") definition. For example, as shown in FIG. 2, the activity 210A may be a utility installation activity that has an expected duration of two hours and is to be performed at the location indicated by the latitude-longitude pair <51.5, −1.45>. The availability period indicates a window of time during which the activity 210A may be performed, for example, a four-hour window from 09:00 hours to 13:00 hours on Apr. 20, 2009. This window may be the result of an appointment made with the customer to gain access to a building in which the utility installation is to be performed.

The SLA definition is a set of parameters for modeling business rules associated with an activity to enable a determination of the importance of the activity relative to other activities at a given point in time. As discussed above, 360 DSE uses the value metric (e.g., revenue less cost) to evaluate and compare different candidate plans. The parameters in an SLA definition for an activity determine a time-varying curve (hereafter an "SLA curve"), where each point on the curve indicates the revenue that would be generated by completing the activity at that point in time. Additionally, an aging factor may be applied to scale up an SLA curve on a daily basis, to encourage 360 DSE to prioritize older activity over newer activities. Different types of SLA curves and their uses are discussed further below in connection with various embodiments.

360 DSE stores the received activity information in a database 230. Additionally, the database 230 may store information regarding a set of resources corresponding to mobile technicians and a set of parts corresponding to tools, materials and/or equipment used by the mobile technicians to perform various activities. For example, the database 230 may store, for each resource, shift times during which the resource is available. A skill level may also be stored for each resource and taken into account when scheduling activities requiring different skill levels. Furthermore, the database 230 may store information that enables 360 DSE to calculate travel cost, overtime cost, and/or any other costs that may be incurred while performing an activity.

Based on any newly received information and the information previously loaded to the database 230, 360 DSE produces a plan that allocates to each available resource a list of activities to be performed over a pre-determined scheduling window (e.g., two or more days beginning from the current time). This process (i.e., loading up-to-date information to the database 230 and running 360 DSE to produce a new plan) may be repeated periodically, for example, once a day, so that each run of 360 DSE takes into account new information that has become available since the previous run.

As shown in FIG. 2, a plan produced by 360 DSE may be reviewed and acted upon by a human dispatcher 240 via an auxiliary software application 250. This application, called the 360 Scheduling Work Bench (hereafter the "360 SWB"), provides a graphical user interface through which the human dispatcher may interact with 360 DSE.

FIG. 3 shows an example of a plan for five resources, 1000 through 1004, presented by the 360 SWB in a Gantt chart format. For each allocated activity (e.g., activity 28 as indicated by a bar 310 in FIG. 3), the plan specifies a scheduled start time and a scheduled end time (e.g., from 9:30 hours to 10:30 hours on Jan. 1, 2006). Each allocated activity may also be preceded and/or followed by a period of travel time (e.g., from 9:00 hours to 9:30 hours for activity 28, as indicated by a thin bar 320 in FIG. 3).

Returning to FIG. 2, the human dispatcher 240 may use 360 SWB to select an activity and commit it to a resource, which may or may not be the resource to which 360 DSE has allocated the activity. Once an activity is committed to a resource, 360 DSE will not attempt to re-allocate the activity to a different resource during a subsequent run. The dispatcher 240 may then finalize a plan for a resource by forwarding to the resource the list of activities committed thereto and instructing the resource to perform the activities at the scheduled times. For example, FIG. 2 shows resources 1000 through 1002 each receiving a corresponding finalized plan.

SUMMARY

The inventors have appreciated that the scheduling and dispatching of field service technicians have conventionally followed an appointment-based approach, where each activity is expected to be performed within an appointment window previously arranged with a customer. The inventors have further appreciated that, for some industries, the appointment-based approach may impose unnecessary constraints and may result in less desirable schedules. For example, an appointment window typically spans several hours within a given calendar day, and thus confines the scheduling of the corresponding activity to that particular calendar day. In view of the foregoing, the inventors have recognized that a higher level of optimization may be achieved by removing at least some scheduling constraints, such as those associated with appointment windows.

Accordingly, embodiments of the present invention relate to various improvements and enhancements to methods, apparatus, and systems for dispatching service technicians. For example, in some embodiments, one or more activities to be scheduled may be associated with a multi-day deadline period, instead of an appointment window that falls within a single calendar day. In one aspect of such embodiments, one or more time periods within the multi-day deadline period may be determined based on shift times of resources available to perform the activity, so that the activity may be scheduled anywhere within these time periods.

The inventors have appreciated that the foregoing practice may afford a dynamic scheduling engine a greater degree of freedom in constructing a significantly improved schedule, and in some instances and optimized schedule, thereby enabling the dynamic scheduling engine to return a schedule of higher quality. For example, rather than being confined within a single calendar day, an activity may be moved from one calendar day to another should the dynamic scheduling engine determine (e.g., in view of new information) that a better schedule can be obtained by moving the activity in this manner.

Yet other embodiments of the present invention are directed to additional or alternative improvements and enhancements to conventional scheduling methods for dispatching field service technicians. For example, in another embodiment, rather than presuming that all field service technicians of a given organization/field service unit are dispatched from a central location (e.g., a main office, shop, or warehouse) at the beginning of a particular shift (and/or need to return to a central location at the end of a shift), scheduling methods, apparatus, and systems according to the inventive concepts disclosed herein may use different start locations for different field service technicians at the start of a shift, and/or different end locations at the end of a shift. This provides for the possibility, for example, that field service technicians need not assemble or convene in a common location before being dispatched and/or at the end of a shift, but alternatively may start and/or end shifts from respective different locations (e.g., their homes; the location of their last job/activity, so as to permit "dovetailing" of shifts, etc.).

In one aspect of this embodiment, home addresses of field service technicians may be maintained in a resource data base, from which such information may be extracted as part of a scheduling process. In another aspect of this embodiment, technicians may be provided with a location tracking system (e.g., a GPS receiver) that they carry on their person, or which is otherwise present with any field service equipment (e.g., a vehicle, tools or other instrumentation, etc.) with which the technician is associated. In this manner, the technician's location at the start and/or end of a shift (or anytime there between) may be recorded, maintained, and used as part of a scheduling process.

In yet other embodiments of the present invention, improvements and enhancements to conventional scheduling methods for dispatching field service technicians relate to scheduling of resources to attend to activities based at least in part on one or more of: job performance information (e.g., information regarding scheduled activities already in progress, such as actual performance time as compared to estimated performance time, which may in some instances be obtained from instrumentation/equipment employed to perform activities); quality assessment information (e.g., information regarding quality of previously scheduled activities or activities already in progress); weather information; traffic information; risk information; penalty or profitability information; and complexity information associated with respective activities to be scheduled. Additionally, in some implementations, scheduling of resources to attend to activities may be based at least in part on contractual obligations between the entity dispatching technicians and responsible for/overseeing the activities, and one or more parties for which the activity/activities is/are being performed. In yet another aspect, scheduling may be based at least in part on statutory and/or regulatory requirements, such as wage and hour compliance for resources (e.g., availability of resources for scheduling complies with applicable wage and hour statutes/regulations), and/or the time and/or manner in which a given activity needs to be performed pursuant to applicable statutes/regulations.

In some aspects, scheduling of resources to attend to activities also or alternatively may be based on other attributes relating to available resources, such as a skill level or particular certification of a technician, historical efficiency of a technician in attending to activities, assignment of a given resource to a particular functional/operational unit (and in some instances the period of time for such an assignment, i.e., for a day, for a week, for a month, etc.), and/or available inventory needed to attend to activities (e.g., is inventory available in technician's vehicle, at a warehouse, available next day, not available in near-term, etc.).

Any one or more of the above-identified parameters, alone or in combination, as well as other parameters relating to resources and/or activities to be scheduled, may be employed to improve scheduling. In one aspect, different parameters may be weighted differently so as to affect scheduling outcomes in different manners, and weighted combinations of parameters may be employed to affect scheduling outcomes. Furthermore, according to other aspects, improved scheduling may be based on considering one or more such parameters a priori as part of a scheduling process, and/or providing one or more such parameters in essentially real-time or regularly/periodically as part of an iterative scheduling process to periodically/continually refine schedules and reallocate resources to activities if necessary (e.g., based on time-varying parameters/conditions).

Some improvements/enhancements are particularly directed to facilitating dispatch of technicians to perform locate and marking operations to detect and/or mark a presence or absence of one or more underground facilities in a dig area to be excavated or disturbed (e.g., in anticipation of excavation activities). For example, in one embodiment directed to the dispatch of locate technicians, ticket information relating to locate request tickets received by a locate contractor or underground facilities owner, for example, may be maintained in a ticket database, and resource information relating to available locate request technicians may be maintained in a resource database. Information may be extracted from one or both of the ticket database and the resource/technician database to provide appropriate inputs to a scheduling engine based at least in part on matching available resources to performance deadlines associated with locate requests. In one aspect of this embodiment, a latest start time for a locate activity is determined based at least in part on the performance deadline for the locate activity (e.g., as indicated in the ticket information), and shift information about the available technicians (e.g., as indicated in the resource/technician database), and this latest start time is provided as an input to a scheduling engine.

In sum, one embodiment of the present invention is directed to an apparatus for dynamically scheduling a plurality of activities, each activity being associated with a performance deadline before which the activity is to be completed. The apparatus comprises at least one processor programmed to: at a first time, generate a first schedule for the plurality of activities, the first schedule comprising a first start time for a first activity of the plurality of activities, the first start time falling on a first calendar day; and at a second time later than the first time, generate a second schedule for the plurality of activities, the second schedule comprising a second start time for the first activity, the second start time falling on a second calendar day different from the first calendar day.

Another embodiment is directed to an apparatus for dynamically scheduling a plurality of activities, each activity being associated with a performance deadline before which the activity is to be completed. The apparatus comprises at least one processor programmed to: retrieve, at a first time, shift information indicating availability of one or more mobile technicians for performing the plurality of activities; identify a performance deadline for an activity of the plurality of activities; and derive an effective deadline for the activity based at least in part on the shift information and the performance deadline.

Another embodiment is directed to an apparatus for dynamically scheduling a plurality of locate activities, each locate activity being associated with a geographic location at which a presence or absence of at least one underground facility is to be determined. The apparatus comprises at least one processor programmed to: determine a first start location of a first locate technician at a beginning of a shift of the first locate technician; determine a second start location of a second locate technician at a beginning of a shift of the second locate technician, the second start location being different from the first start location; and allocate the first mobile technician to a first locate activity and the second mobile technician to a second locate activity, based at least in part on the first and second start locations and the geographic locations associated respectively with the first and second locate activities.

Another embodiment is directed to a system for dispatching a plurality of locate technicians to perform a plurality of locate activities, each locate activity corresponding to at least one locate ticket requesting that a presence or absence of at least one underground facility be determined within a planned dig area. The system comprises at least one first storage device for maintaining a ticket database, and at least one second storage device for maintaining a technician database. The system further comprises at least one first processor programmed to implement a scheduling engine for allocating the plurality of locate technicians to the plurality of locate activities, and scheduling the plurality of locate activities. The system further comprises at least one second processor programmed to implement a dispatch engine for retrieving ticket information from the ticket database, and determining a performance deadline for a locate activity of the plurality of locate activities based at least in part on the ticket information retrieved from the ticket database. This dispatch engine also retrieves technician information from the technician database, wherein the technician information comprises shift information indicating availability of the plurality of locate technicians. The dispatch engine provides inputs to the scheduling engine based at least in part on the ticket information and the technician information; in particular, the dispatch engine determines a latest start time for the locate activity based at least in part on the performance deadline for the locate activity and the shift information, and provides the latest start time to the scheduling engine in association with the locate activity.

Another embodiment is directed to a computer-implemented method for dispatching a plurality of locate technicians to perform a plurality of locate activities, each locate activity corresponding to at least one locate ticket requesting that a presence or absence of at least one underground facility be determined within a planned dig area. The method comprises: retrieving technician information from a technician database maintained on at least one first storage device, the technician information comprising shift information indicating availability of the plurality of locate technicians; providing first inputs to a scheduling engine based at least in part on the technician information; retrieving ticket information from a ticket database maintained on at least one second storage device; determining a performance deadline for a locate activity of the plurality of locate activities based at least in part on the ticket information; providing second inputs to a scheduling engine based at least in part on the ticket information and the technician information, comprising determining a latest start time for the locate activity based at least in part on the performance deadline for the locate activity and the shift information; and selecting, by the scheduling engine, a start time for the locate activity based at least in part on the first and second inputs.

Another embodiment is directed to at least one computer-readable storage medium encoded with instructions that, when executed by at least one processor, perform a method for scheduling dispatch a plurality of locate technicians to perform a plurality of locate activities. Each locate activity corresponds to at least one locate ticket requesting that a presence or absence of at least one underground facility be determined within a planned dig area. The method comprises: A) retrieving technician information from a technician database maintained on at least one first storage device, the technician information comprising shift information indicating availability of the plurality of locate technicians; B) providing first inputs to a scheduling engine based at least in part on the technician information; C) retrieving ticket information from a ticket database maintained on at least one second storage device; D) determining a performance deadline for a locate activity of the plurality of locate activities based at least in part on the ticket information; and E) providing second inputs to a scheduling engine based at least in part on the ticket information and the technician information, comprising determining a latest start time for the locate activity based at least in part on the performance deadline for the locate activity and the shift information.

Another embodiment is directed to an apparatus for dynamically dispatching a plurality of locate technicians to perform a plurality of locate operations in response to a plurality of locate request tickets. Each locate request ticket identifies a geographic location for one locate operation of the plurality of locate operations and a performance time window within which the one locate operation must be performed. The apparatus comprises a communication interface, a memory to store processor-executable instructions, and a processing unit coupled to the communication interface and the memory. Upon execution of the processor-executable instructions by the processing unit, the processing unit generates a schedule plan for each of the plurality of locate technicians available to perform the plurality of locate operations, based at least in part on a plurality of different geographic start locations for the available plurality of locate technicians, and the geographic location and the performance time window identified in each of the plurality of locate request tickets.

Another embodiment is directed to at least one computer readable medium encoded with instructions that, when executed on at least one processing unit, perform a method for dynamically dispatching a plurality of locate technicians to perform a plurality of locate operations in response to a plurality of locate request tickets. Each locate request ticket identifies a geographic location for one locate operation of the plurality of locate operations and a performance time window within which the one locate operation must be performed. The method comprises: A) identifying the plurality of locate technicians available to perform the plurality of locate operations; B) identifying a plurality of different geographic start locations for the plurality of locate technicians identified in A); and C) providing a schedule plan for each of the plurality of locate technicians identified in A) based at least in part on the plurality of different geographic start locations identified in B), and the geographic location and the performance time window identified in each of the plurality of locate request tickets.

Another embodiment is directed to a method for dynamically dispatching a plurality of locate technicians to perform a plurality of locate operations in response to a plurality of locate request tickets. Each locate request ticket identifies a geographic location for one locate operation of the plurality of locate operations and a performance time window within which the one locate operation must be performed. The method comprises: A) identifying the plurality of locate technicians available to perform the plurality of locate operations; B) identifying a plurality of different geographic start locations for the plurality of locate technicians identified in A); and C) providing a schedule plan for each of the plurality of locate technicians identified in A) based at least in part on the plurality of different geographic start locations identified in B), and the geographic location and the performance time window identified in each of the plurality of locate request tickets.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 4A shows an example of a plan for a plurality of resources, where each activity that has already missed, or is going to miss, a due date is shown with a diamond.

DETAILED DESCRIPTION

Figure 1:
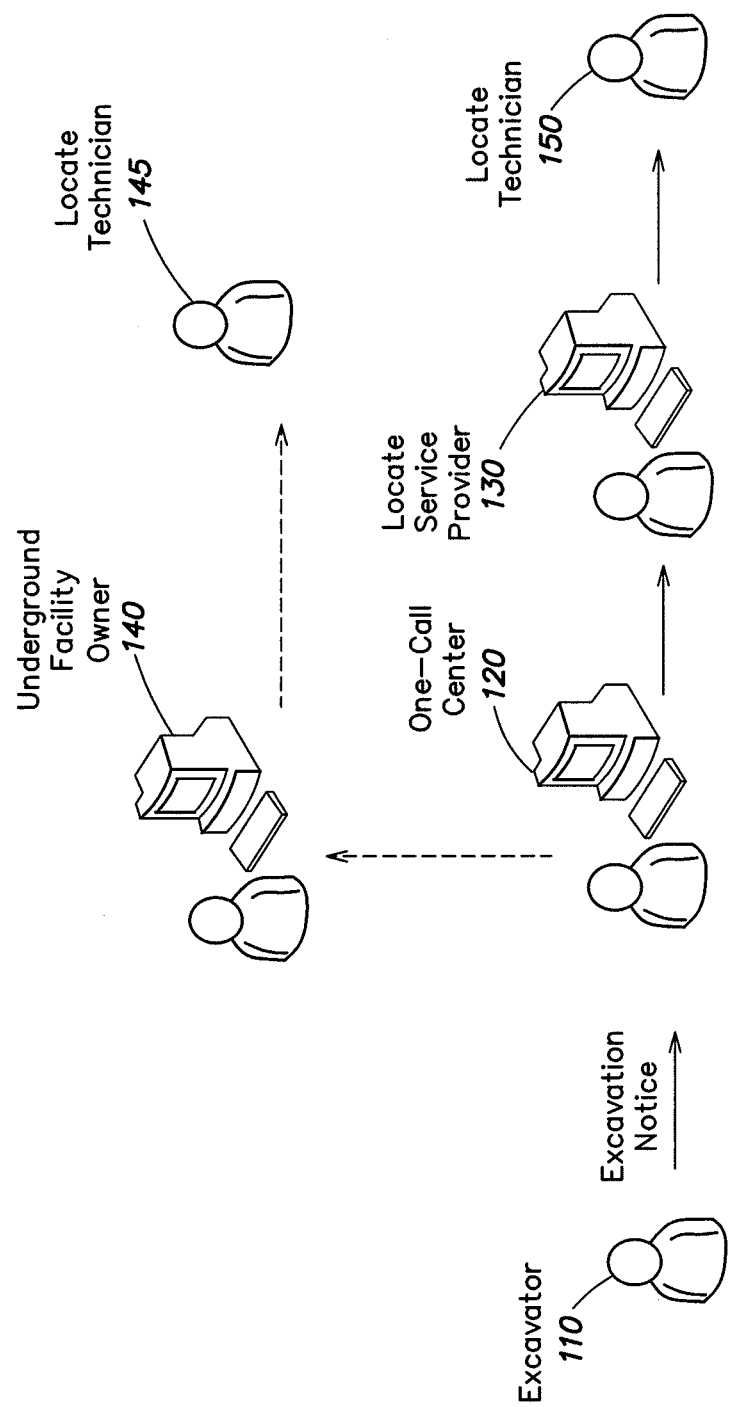
FIG. 1 shows an example in which a locate operation is initiated as a result of an excavator serving an excavation notice to a one-call center.

The inventors have appreciated that one of the challenges associated generally with field service applications, and in particular with underground facility locate operations, relates to the dynamic dispatch of multiple field service technicians in response to changing conditions, such as traffic, weather, unexpected complexity of activities and/or incoming activity requests (e.g., locate request tickets). While some attempts have been made in industries such as appliance repair, utility installation and meter reading to use a scheduling engine to dynamically schedule activities, the degree to which a schedule is optimized based on the latest information has been limited.

For example, in a conventional application of a scheduling engine such as 360 DSE, new information is collected and provided to the scheduling engine relatively infrequently (e.g., once a day or a few times throughout the day), at least in part due to the lack of an information infrastructure for gathering, processing, and disseminating information in a more timely fashion (e.g., every five minutes). Developing such an information infrastructure is a particularly challenging task in field service applications, as the activities are dispersed geographically and the technicians are highly mobile.

Furthermore, the inventors have recognized that locate operations (i.e., determining a presence or an absence of underground facilities prior to excavation) may differ from other types of field service operations in several aspects. As a result, different approaches to dynamic scheduling for locate operations are warranted.

For example, many field service applications, such as appliance repair and utility installation, are appointment driven. That is, an appointment must be made with a customer or a service recipient prior to undertaking an activity, e.g., to gain access to the activity location or some other type of permission. The appointment specifies a time window (hereafter an "appointment window") during which a technician is expected to arrive at the location to complete the activity. Typically, an appointment window spans several hours on a given day (e.g., from 08:00 hours to 12:00 hours, or from 13:00 hours to 17:00 hours), and the customer is required to be present for the arrival of the technician. For good customer relations, it is imperative that the activity be performed within the appointment window once the appointment has been arranged. Therefore, when using a dynamic scheduling engine in an appointment-based application, the appointment window is conventionally provided to the dynamic scheduling engine as a scheduling constraint, which may lower the level of optimization that can otherwise be achieved by using the dynamic scheduling engine.

By contrast, locate operations may not be constrained by customer appointments in the manner described above, because many locate operations are performed at easily accessible outdoor locations. Instead, a locate ticket may be associated with a deadline (e.g., 48 hours or 72 hours from the receipt of the request) rather than an appointment window, and the corresponding locate operation may be performed at any time before the deadline.

In some exceptional emergency circumstances, locate tickets are specified with a significantly shorter performance window (e.g., on the order of two to four hours within which the locate operation needs to be completed), but more typically a longer window (e.g., 48 hours) is provided. Thus, the window of time during which a locate operation may be performed may span multiple calendar days, rather than being confined to a single day as conventionally envisioned.

As another example, it is conventionally presumed that each mobile technician departs at the beginning of a shift from a central location (e.g., a terminal or warehouse at which field service vehicles are kept and serviced) and returns to the same central location at the end of the shift. The inventors have recognized that this assumption in some cases may not be warranted for locate operations. For example, a locate technician may not be required to report to any central location at the beginning of a shift, and may instead travel to a first activity of the shift from home or from any other starting location. Likewise, a locate technician may not be required to return to a central location at the end of a shift. Instead, a shift may be considered to have ended at the completion of the last activity of the shift, after which the technician may not receive any compensation for traveling time.

The inventors have further recognized that the expected duration of a locate operation may be significantly shorter compared to expected durations in other field service applications. For example, many routine locate operations nominally may be expected to take on the order of 15 to 30 minutes, while an appliance repair or utility installation may be expected to take multiple hours. The shorter expected durations, combined with the multi-day deadline periods as discussed above, may provide more opportunities for a scheduling engine to optimize a schedule by adjusting scheduled start times and/or technician assignments. That is, for a locate operation, the expected duration may be a relatively small fraction (e.g., on the order of one hundredth) of the window of time during which the locate operation may be performed. As a result, many combinations of start times and/or technicians may be possible for each locate operation, which may in turn lead to a higher level of optimization.

Additionally, the actual duration of locate operations may have a greater degree of statistical variation compared to the actual duration of activities in other field service applications. For example, a utility installation may be expected to take two hours, and in most cases the actual duration may be between 1.75 hours and 2.25 hours. By contrast, a locate operation may be expected to take 15 minutes, but, once on site, a technician may discover a complex situation involving multiple facilities that are not originally anticipated. As a result, the actual duration of the locate operation may be twice the expected duration, or an even higher multiple.

I. Overview

In view of the foregoing, various embodiments described herein relate to systems, methods and apparatus for improved dynamic dispatch of field service technicians and, in particular, the dispatch of locate technicians to identify the presence or absence of one or more underground facilities in a dig area to be excavated or otherwise disturbed. While the particular example of scheduling for underground facility locate operations is provided herein primarily for purposes of illustration, it should be appreciated that the inventive concepts described herein may be more generally applicable to other types of field service applications.

In exemplary implementations according to the present disclosure, the 360 DSE may be employed to facilitate scheduling and dynamic dispatch of locate technicians. However, the inventors have recognized and appreciated that various modifications and/or additions may be made to the 360 DSE to provide functionalities that are desirable in the management of locate operations. Accordingly, the various systems, methods and apparatus described herein may include functional aspects, in whole or part, of the 360 DSE, together with other functional aspects as discussed in greater detail below.

As discussed above, the inventors have appreciated that the conventional practice of specifying appointment windows may impose unnecessary constraints and may result in less desirable schedules. Thus, in some embodiments, activities may be provided to a dynamic scheduling engine without availability constraints associated with appointment windows. Instead, one or more time periods may be determined for each activity based on a deadline associated with the activity (e.g., 48 hours from the time an activity request is received) and relevant shift times of the resources to whom the activity may be allocated (e.g., 8:00 hours to 17:00 hours daily). One or more SLA curves may then be defined for the activity over these time periods, so that the dynamic scheduling engine may schedule the activity anywhere within these time periods.

The inventors have appreciated that the foregoing practice may give the dynamic scheduling engine a greater degree of freedom in constructing an optimized schedule, and therefore may enable the dynamic scheduling engine to return a schedule of higher quality. For example, rather than being confined within an appointment window spanning several hours on a given day, an activity may be moved from one calendar day to another should the dynamic scheduling engine determine (e.g., in view of new information) that a better schedule can be obtained by moving the activity in this manner.

While the example of a 48-hour deadline period is provided primarily for purposes of illustration, it should be appreciated that the inventive concepts discussed herein are not limited in this respect, and that a variety of deadline periods are contemplated by the present disclosure. It should also be appreciated that the quality of a schedule may be measured using any suitable metric, for example, the degree to which available capacity is utilized, the amount of travel time and/or cost incurred, the number of deadlines missed over a given time period, or a suitable combination thereof. In the context of a particular dynamic scheduling engine, the quality of a schedule may be measured by the metric against which the dynamic scheduling engine is programmed to optimize. For example, in the case of 360 DSE, the metric for optimization is the overall value (i.e., total revenue less total cost) associated with a schedule.

In some further embodiments, the quality of the schedules produced by a dynamic scheduling engine may be improved by removing or modifying one or more location constraints at the beginning and/or the end of a technician's shift. For example, a technician's home address or some other suitable address may be used as a starting location for a shift, instead of a central office location with which the technician is affiliated. Thus, different geographic starting locations may be used for different field service technicians. Additionally, or alternatively, the location constraint at the end of the shift may be removed entirely, so that the time and cost of traveling after the last activity of the shift are taken out of consideration by the dynamic scheduling engine. These and similar practices may afford the dynamic scheduling engine a greater degree of freedom in constructing an optimized schedule, thereby improving the quality of the returned schedules. For example, these practices may facilitate completion of all locate request tickets in a timely manner, reduce travel time for a given technician between locate operations, and generally optimize the utilization of resources (e.g., locate technicians).

Furthermore, the inventors have recognized that activity status may change rapidly in field service applications such as locate operations, at least in part due to generally shorter expected durations for performing locate operations and/or a higher degree of variability in the actual durations. Accordingly, in some embodiments, information updates may be provided to a dynamic scheduling engine frequently, for example, in real time or near real time (e.g., every five minutes) throughout a work day. This practice may enable the dynamic scheduling engine to react to new information in a timely fashion by constantly readjusting a schedule, thereby providing more opportunities to improve the schedule with respect to the corresponding optimization metric (e.g., the value metric as used in 360 DSE). Frequent information updates may also allow the dynamic scheduling engine to make decisions based on more accurate assumptions about actual conditions in the field, which may improve the quality of the schedule as measured by actual outcomes.

In yet other embodiments of the present invention, improvements and enhancements to conventional scheduling methods for dispatching field service technicians relate to scheduling of resources to attend to activities based at least in part on one or more additional parameters relating to the activities to be scheduled and/or the available resources.

For example, "job performance information" may be provided as one or more parameters that affect scheduling outcomes. Examples of job performance information include, but are not limited to, information regarding scheduled activities already in progress or completed, such as actual performance time as compared to estimated performance time. More specifically, in some implementations, the real-time progress of a previously scheduled activity may be monitored and compared against an original estimated performance time to assess a deviation. Performance time deviations of one or more activities in progress, as well as historical performance time deviations for similar activities, may be employed to better estimate performance times for future scheduling processes, and thereby improve outcomes of subsequent iterations of a scheduling process.

In some implementations, job performance information, including status of an activity in progress or already completed (e.g., actual performance time, or other metrics relating to degree of completion), may be obtained from instrumentation or equipment being used by a technician in connection with performance of the activity. For example, in one implementation relating to locate operations, job performance information may be acquired, for purposes of scheduling according to the various inventive concepts discussed herein, by a locate device as described, for example, in U.S. non-provisional application Ser. No. 12/571,329, filed Sep. 30, 2009, entitled "Methods and Apparatus for Generating Electronic Records of Locate Operations," which application is incorporated herein by reference.

In another implementation relating to locate operations, job performance information may be acquired from a marking apparatus as described, for example, in U.S. publication no. 2008-0228294-A1, published Sep. 18, 2008, filed Mar. 13, 2007, and entitled "Marking System and Method With Location and/or Time Tracking," U.S. publication no. 2008-0245299-A1, published Oct. 9, 2008, filed Apr. 4, 2007, and entitled "Marking System and Method," U.S. publication no. 2009-0204238-A1, published Aug. 13, 2009, filed Feb. 2, 2009, and entitled "Electronically Controlled Marking Apparatus and Methods," and U.S. non-provisional application Ser. No. 12/568,087, filed Sep. 28, 2009, and entitled "Methods and Apparatus for Generating an Electronic Record of Environmental Landmarks based on Marking Device Actuations," all of which applications are incorporated herein by reference. These applications describe, amongst other things, collecting information relating to the geographic location, time, and/or characteristics (e.g., color/type) of dispensed marking material from a marking device and generating an electronic record based on this collected information.

In connection with improved and/or enhanced scheduling, in another example "quality assessment information" may be provided as one or more parameters that affect scheduling outcomes. Quality assessment information may include, but is not limited to, information regarding a quality of previously scheduled activities or activities already in progress. Such information may be used by a scheduling method, apparatus, or system according to various embodiments of the present invention, for example, to determine if an activity in progress needs to be extended for reasons relating to the quality of performance, if additional resources may need to be scheduled in the near-term, or the entire activity itself needs to be rescheduled (with the same, additional, or different resources) due to quality issues in connection with performance of the activity. Various concepts relating to quality assessment in connection with locate and marking applications, and various criteria and metrics employed for assessing quality (which similarly may be employed in connection with the inventive scheduling concepts disclosed herein) are discussed in U.S. non-provisional application Ser. No. 12/493,109, filed Jun. 26, 2009, entitled "Methods and Apparatus for Quality Assessment of a Field Service Operation," which application is incorporated herein by reference in its entirety.

Yet other parameters that may be used to improve and enhance scheduling methods for dispatching field service technicians include weather information, traffic information, risk information, penalty or profitability information, and complexity information associated with respective activities to be scheduled. For example, a priority of an activity to be scheduled may be weighted based on factors relating to weather (e.g., significantly inclement versus clear in the vicinity of the activity site), traffic (e.g., access to and/or level of congestion on various routes to reach the activity site), risk (e.g., is the activity associated with a high-damage risk, or relatively low risk), penalty or profitability (e.g., penalty associated with non-completion of the activity if it is relegated to last in the schedule, or bumped-off the schedule completely; price points associated with different activities/ parties contracting for performance of activities), and complexity (e.g., restricted access to activity site, multiple/several components to activity, particular skill level or technician certification required, etc.).

With respect to weather and traffic information, the methods, apparatus and systems disclosed herein may access such information via the Internet or any other suitable source, for example, on an as-needed or periodic basis. With respect to risk, penalty, profitability, and/or complexity information, this information may be generated and/or analyzed pursuant to some of the inventive concepts discussed herein, and/or may be acquired from various sources and used "as-is" to implement some of the scheduling concepts disclosed herein (e.g., entities dispatching technicians may have other systems in place to assess risk, penalty or profitability, and/or complexity, for example associated with various activities). Examples of methods, apparatus and systems for assessing activities to be scheduled and providing information relating to risk, penalty or profitability and/or complexity, for example, are discussed in U.S. Provisional Patent Application No. 61/220,491, filed Jun. 25, 2009, entitled, "Methods and Apparatus for Assessing Field Service Operation Tickets," which application is incorporated herein by reference.

In yet other embodiments, scheduling of resources to attend to activities may be based at least in part on contractual obligations between the entity dispatching technicians and responsible for/overseeing the activities, and one or more parties for which the activity/activities is/are being performed. Such contractual obligations may in some instances relate to some of the parameters introduced above (but may also or alternatively relate to other parameters). For example, pursuant to respective contracts with different parties for which activities are performed, the entity dispatching technicians may be paid more for a given activity by a first party than by a second party. Similarly, different activities specified in a contract may have different price points. Additionally, the non-performance of some activities outlined in a contract may be associated with a particular penalty. Accordingly, some types of contractual obligations may constitute penalty and/or profitability information on which scheduling may be based, as discussed above. Contractual obligations may also relate, for example, to statutory and/or regulatory requirements for performing activities and/or use of resources, best practices, and/or a standard operating procedure relating to same, any or all of which may be used as parameters on which scheduling may be based.

More generally, apart from contractual obligations, in yet other embodiments, scheduling may be based at least in part on statutory and/or regulatory requirements, such as wage and hour compliance for resources (e.g., availability of resources for scheduling complies with applicable wage and hour statutes/regulations), and/or the time and/or manner in which a given activity needs to be performed pursuant to applicable statutes/regulations. Similarly, established industry best practices for particular activities may provide one or more parameters for scheduling, as may standard operating procedures of either the entity dispatching technicians or the party/parties for which activities are performed. An example of a best practices guide for the locate and marking industry which may inform the selection of one or more parameters for scheduling, and which in some cases may inform one or more standard operating procedures for an entity that may also bear upon scheduling according to various concepts described herein, is the Best Practices Version 6.0 document, published in February 2009 by the Common Ground Alliance (CGA) of Alexandria, Va. (www.commongroundalliance.com), which document is hereby incorporated herein by reference (this document is a compilation of current recommended practices designed to prevent damages to underground facilities).

In yet other embodiments, scheduling of resources to attend to activities also or alternatively may be based on other attributes relating to available resources, such as a skill level or particular certification of a technician, historical efficiency of a technician in attending to activities, assignment of a given resource to a particular functional/operational unit (and in some instances the period of time for such an assignment, i.e., for a day, for a week, for a month, etc.), and/or available inventory needed to attend to activities (e.g., is inventory available in technician's vehicle, at a warehouse, available next day, not available in near-term, etc.).

Any one or more of the above-identified parameters, alone or in combination, as well as other parameters relating to resources and/or activities to be scheduled, may be employed according to various embodiments of the present invention to improve scheduling. In one aspect, different parameters may be weighted differently so as to affect scheduling outcomes in different manners, and combinations of differently weighted parameters may be employed to affect scheduling outcomes. Furthermore, according to other aspects, improved scheduling may be based on considering one or more such parameters a priori as part of a scheduling process, and/or providing one or more such parameters in essentially real-time or regularly/ periodically as part of an iterative scheduling process to periodically/continually refine schedules and reallocate resources to activities if necessary.

Following below are more detailed descriptions of various concepts related to, and embodiments of, inventive systems, methods and apparatus for dynamically dispatching field service technicians. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

II. System Architecture and Components

Figure 4:
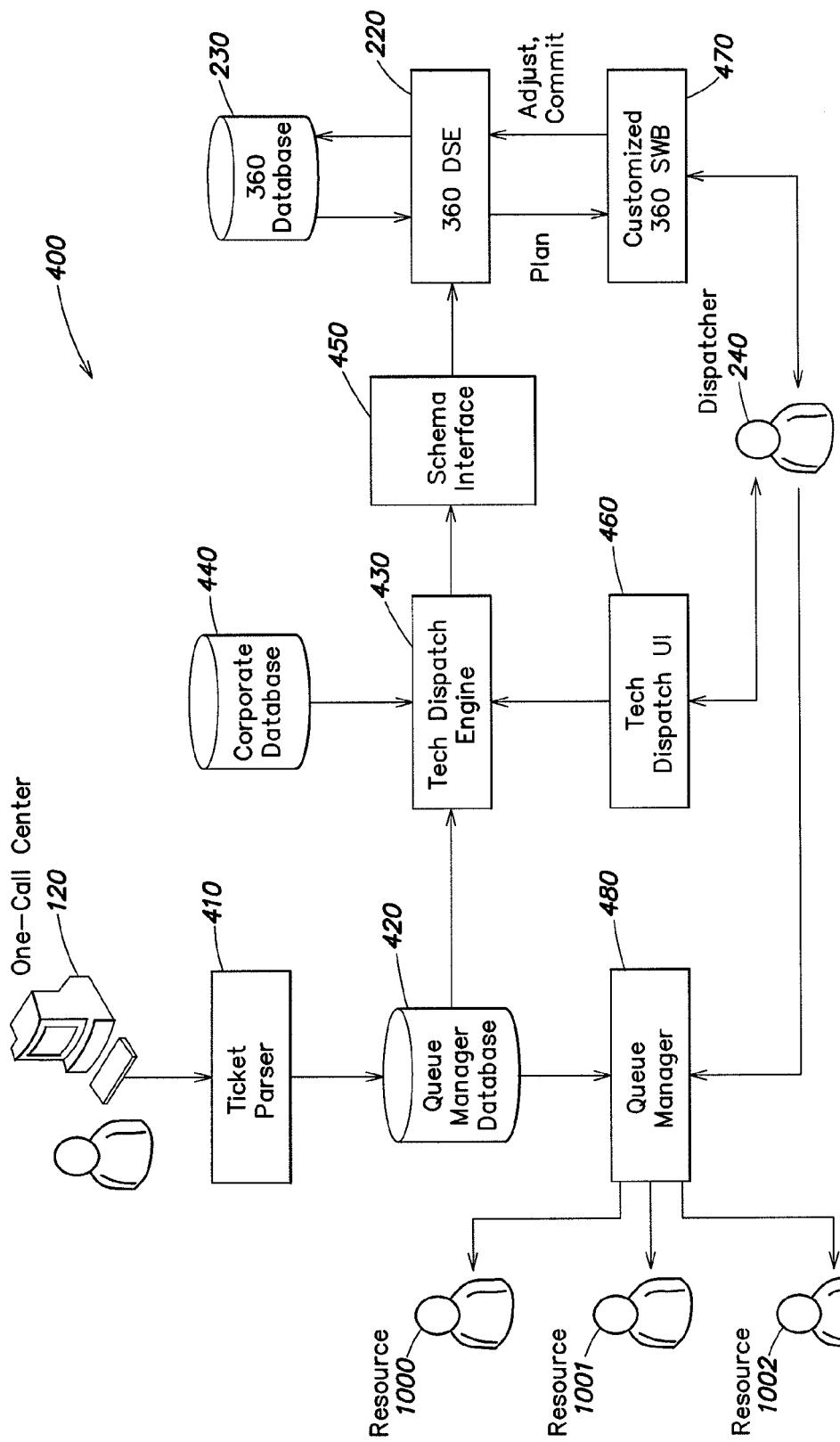
FIG. 4 shows an example of a system for dynamically dispatching field service technicians, in accordance with some embodiments of the present invention.

FIG. 4 shows an example of a system 400 for dispatching field service technicians, such as locate technicians, in accordance with some embodiments of the present invention.

In this example, the system 400 comprises a plurality of software components for extracting information from incoming activity requests (e.g., tickets), transforming the extracted information according to appropriate business rules, and loading the result of the transformation to a dynamic scheduling engine to obtain an optimized plan for each available resource. Generic terms such as "engine" or "manager" may be used herein when referring to one or more of these software components and the execution thereof by one or more computing devices including one or more processors to implement various functionality as discussed herein (e.g., computer-implemented methods/processes). Such terms should not be interpreted as being limiting in any way.

Each of the software components described herein may be implemented in any suitable way, for example, as processor-executable instructions stored in at least one physical storage device (e.g., a non-volatile memory device and/or a volatile memory device) of a general purpose computer or any other suitable hardware system. The general purpose computer or hardware system may comprise at least one hardware processor for executing the instructions stored in the physical storage device, and may further comprise at least one input/output (I/O) interface for receiving inputs from input sources or devices and for sending outputs to output recipients or devices. In some embodiments, the at least one hardware processor on which a software component executes may be in a mobile or portable device, such as a mobile telephone, personal digital assistant, a marking device (e.g., for spray painting lines or other marks on the ground), or any other type of mobile or portable device.

Referring to FIG. 4, incoming tickets may arrive at the system 400 from a one-call center 120, or from another interested party such as an underground facility owner (not shown). Depending on its origin, each ticket may contain different types of information expressed in different formats. Thus, as an initial processing step, each ticket may be fed into a parser 410, which converts the ticket into a standardized format, also referred to herein as a "work order," by parsing the ticket and extracting meaningful data elements. The following is an illustrative and non-exhaustive list of various types of data elements that may be extracted by the parser 410.

Ticket identification information, e.g., a ticket number.

Timing information, e.g., date and time at which the ticket was issued and/or a deadline by which the requested operation must be completed.

Location information, e.g., an address at which the dig area is located or a pair of latitudinal and longitudinal coordinates (hereafter "lat/long coordinates") for the dig area.

Excavation information, e.g., the type, depth, extent and method of excavation.

Excavator information, e.g., name of the excavation company and contact information such as a mailing address, a phone number, a facsimile number, and/or an email address.

Caller information, e.g., name and phone number for contact person at the excavation company.

Site information, e.g., a map of the dig area and/or textual description of the dig area and/or surrounding landmarks.

Location operation instructions information, e.g., instructions for how to mark located facilities.

Remarks information, e.g., access restrictions to the dig area, including time-of-day restrictions, permit requirements and/or security clearance requirements.

Task information, e.g., number and types of underground facilities to be located, such as gas, electric, and/or communication cables.

Thus, it should be appreciated that in some inventive embodiments disclosed, information is extracted from an original ticket (e.g., via parsing), and such information may be filtered, reorganized, or otherwise altered in some manner to provide a standardized output such as a work order. For purposes of the present disclosure, any information originally derived from, extracted from, or otherwise pertaining to an original locate request ticket (e.g., issued from a one call center) is referred to as "ticket information." Ticket information may be presented, formatted, filtered and/or reorganized in any of a variety of manners, and in some implementations discussed herein ticket information may be formulated into a work order having a standardized format.

Once a ticket is parsed and converted into the standardized format by the parser 410, the extracted ticket information (e.g., in the form of a work order) is stored in a database such as the queue manager (QM) database 420 shown in FIG. 4. The QM database 420 may provide various database functions such as sorting and indexing based on various fields in the standardized ticket format.

While the extraction of ticket information from a ticket as issued by a one call center is discussed above for purposes of illustration, it should be appreciated that the parser 410 may be configured according to other embodiments to process other sources of ticket information (e.g., work orders themselves), which in some instances may not necessarily be received from a one call center itself. Accordingly, in some embodiments the parser 410 may be more generally viewed as a component that extracts relevant ticket information from any of a variety of possible sources including, but not limited to, tickets issued by and received from one call centers, work orders received from facility owners, work orders received from various locate contractors desiring to schedule and dispatch locate technicians, other sources of information relating to a proposed excavation, and the like. Regardless of source, the parser 410 generally extracts and reorganizes ticket information into a standardized format which is then stored in a database (e.g., the QM database 420 shown in FIG. 4).

In some embodiments, tickets may be parsed and stored as soon as, or shortly after, they arrive at the system 400, so that the most up-to-date ticket information is made available via the QM database 420. For example, in the embodiment shown in FIG. 4, a tech dispatch engine 430 for transforming ticket information may be programmed to retrieve new ticket information from the QM database 420 periodically (e.g., every five, ten or fifteen minutes). Alternatively, the QM database 420 may be programmed to push the new ticket information to the tech dispatch engine 430 whenever the new ticket information becomes available. Depending on the frequency at which new ticket information is transferred from the QM database 420 to the tech dispatch engine 430, it may be particularly beneficial to ensure that the QM database 420 is updated in a timely manner to reflect any newly arriving ticket information.

Ticket information retrieved from the QM database 420 (e.g., in the form of a reformatted ticket or work order) may be processed by the tech dispatch engine 430 and transformed into one or more activities to be scheduled by 360 DSE (shown as component 220 in FIG. 4). For example, the tech dispatch engine 430 may extract from the ticket information a number of data elements and use the extracted data elements to derive the input parameters expected by 360 DSE, such as duration, location and SLA parameters. In some embodiments, the tech dispatch engine 430 may be programmed to perform the above data transformation in accordance with some appropriate business rules. That is, the tech dispatch engine 430 may use the appropriate business rules to intelligently provide inputs to 360 DSE, so as to encourage 360 DSE to behave in certain desirable manners. Examples of data transformations that may be performed by the tech dispatch engine 430 are discussed in greater detail below in connection with FIGS. 6-10.

In some embodiments, the tech dispatch engine 430 may also extract and transform resource information. For example, the tech dispatch engine 430 may be programmed to retrieve information from a corporate database 440, which may store information relating to one or more corporate offices and the locate technicians (resources) affiliated with these corporate offices. Additionally, the tech dispatch engine 430 may transform the office and resource information retrieved from the database 440 into input parameters expected by 360 DSE, such as resource start locations, shift times and break times. An illustrative method that may be used by the tech dispatch engine 430 to perform resource data transformation is discussed in greater detail below in connection with FIG. 11.

In addition to retrieving information from the QM database 420 and the corporate database 440, the tech dispatch engine 430 may receive inputs from a human dispatcher 240. In some embodiments, a tech dispatch user interface (UI) 460 may be provided to enable the human dispatcher 240 to make any desirable adjustments to the activity and/or resource information being processed by the tech dispatch engine 430. Examples of various types of adjustments that may be made via the tech dispatch UI 460 are discussed further below in connection with FIGS. 12 and 13.

In some embodiments, the tech dispatch engine 430 may manipulate and output data using a schema that is different from the input schema expected by 360 DSE. Therefore, a schema interface 450 may be used to map the output schema of the tech dispatch engine 430 to the input schema of 360 DSE. In one embodiment, the schema interface 450 may be provided as a Windows Communication Foundation (WCF) service invoked by the tech dispatch engine 430 to pass input parameters to 360 DSE. For example, the schema interface 450 may convert the output of the tech dispatch engine 430 to one or more XML files and provide the XML files to 360 DSE.

Following below is an illustrative and non-exhaustive list of data transformations that may be performed by the schema interface 450.

Text fields such as various address fields may be truncated to comply with maximum length restrictions for input to 360DSE.

An earliest start time for an activity may be determined based on a type of the activity. For example, for a meet ticket, the earliest start time may be set to the beginning of an appointment arranged with an excavator. For other ticket types, a "do_not_mark_before" date (e.g., as specified on the ticket by the excavator) may be used if it is available. Otherwise, the time at which the ticket is received and processed may be used, so the activity may be immediately available for scheduling.

A latest start time for an activity may be determined based on a type of the activity and an expected duration. For example, for a meet ticket, the latest start time may be set to the beginning of an appointment arranged with an excavator plus an expected duration. For other ticket types, a latest start time may be set to an effective deadline minus an expected duration. (Further details regarding effective deadlines are discussed below in connection with FIG. 8.) If an expected duration is not available for the ticket, then a default duration such as 15 minutes may be used.

A base value for an activity may be determined based on character strings and/or numeric priority codes that are present in the ticket. For example, if the ticket contains the string "emer" or a priority code 1, then the base value may be set to 900. If the ticket contains strings such as "rush," "slut" or "short," then the base value may be set to 800. Otherwise, the base value may be set to 700. As discussed above, 360 DSE attempts to maximize value, therefore an activity with a higher base value may be prioritized over an activity with a lower base value.

Figure 7:
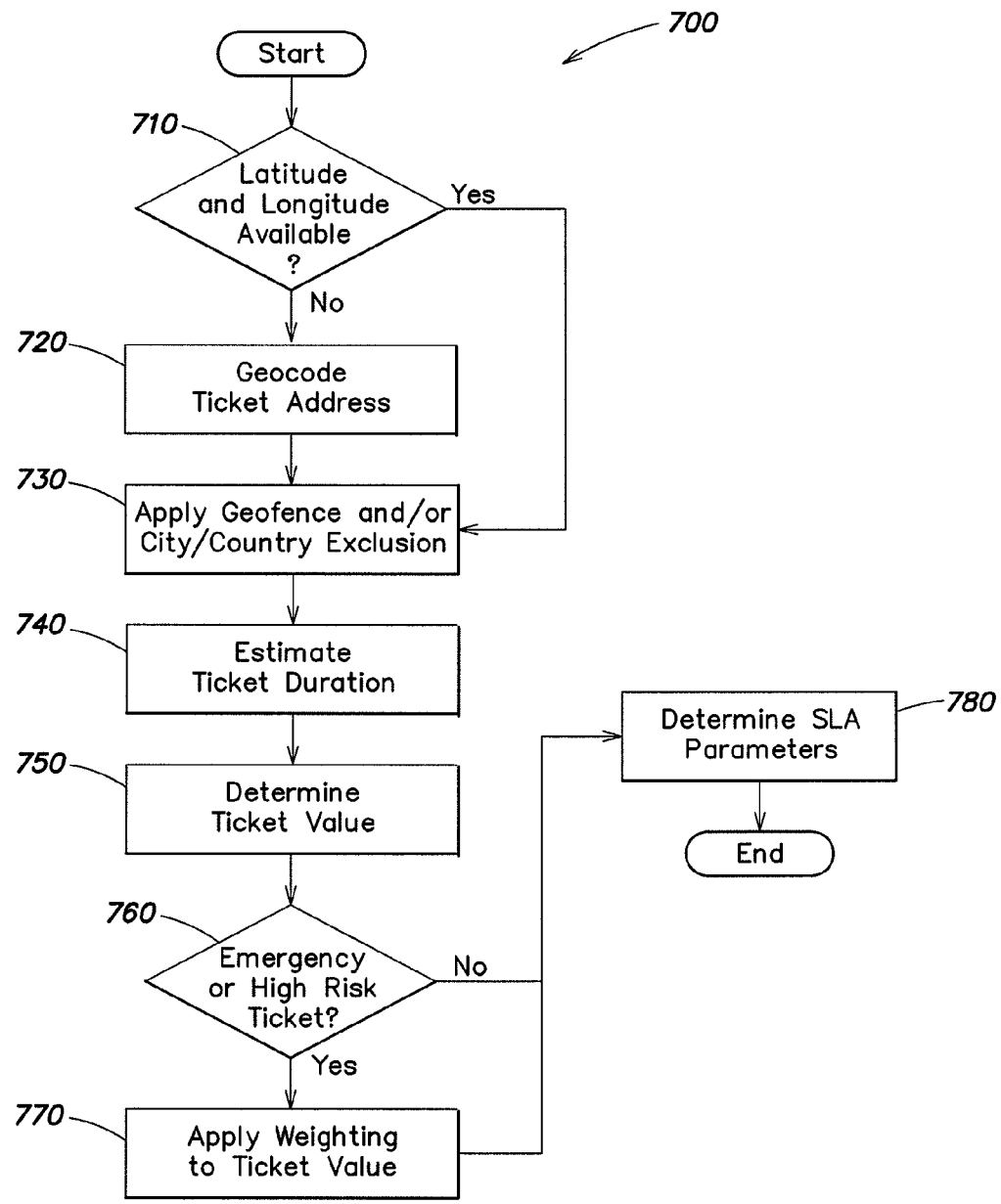
FIG. 7 shows an illustrative process for transforming ticket information into input parameters to be provided to a dynamical scheduling engine, in accordance with some embodiments of the present invention.

Further details regarding the use of base values are discussed below in connection with FIG. 7.

If not directly available, a pair of lat/long coordinates may be obtained by computing a centroid for a polygon corresponding to the dig area.

It should be appreciated that any suitable combination of these and/or other transformations may be performed by the schema interface 450, as the present disclosure is not limited in this respect. Additionally, while the schema interface 450 may provide certain benefits from a perspective of software development and maintenance, the use of such an interface is entirely optional. For example, the tech dispatch engine 430 may instead produce outputs in XML format suitable for direct input to 360 DSE.

It should also be appreciated that the tech dispatch engine 430 may provide inputs to 360 DSE in any suitable manner, for example, periodically and/or on an event-driven basis. In some embodiments, the tech dispatch engine 430 may provide inputs to 360 DSE whenever new information is retrieved from the QM database 420 and transformed under the appropriate business rules. In other embodiments, the outputs of the tech dispatch engine 430 may be batched and provided to 360 DSE according to a predetermined schedule.

Figure 2:
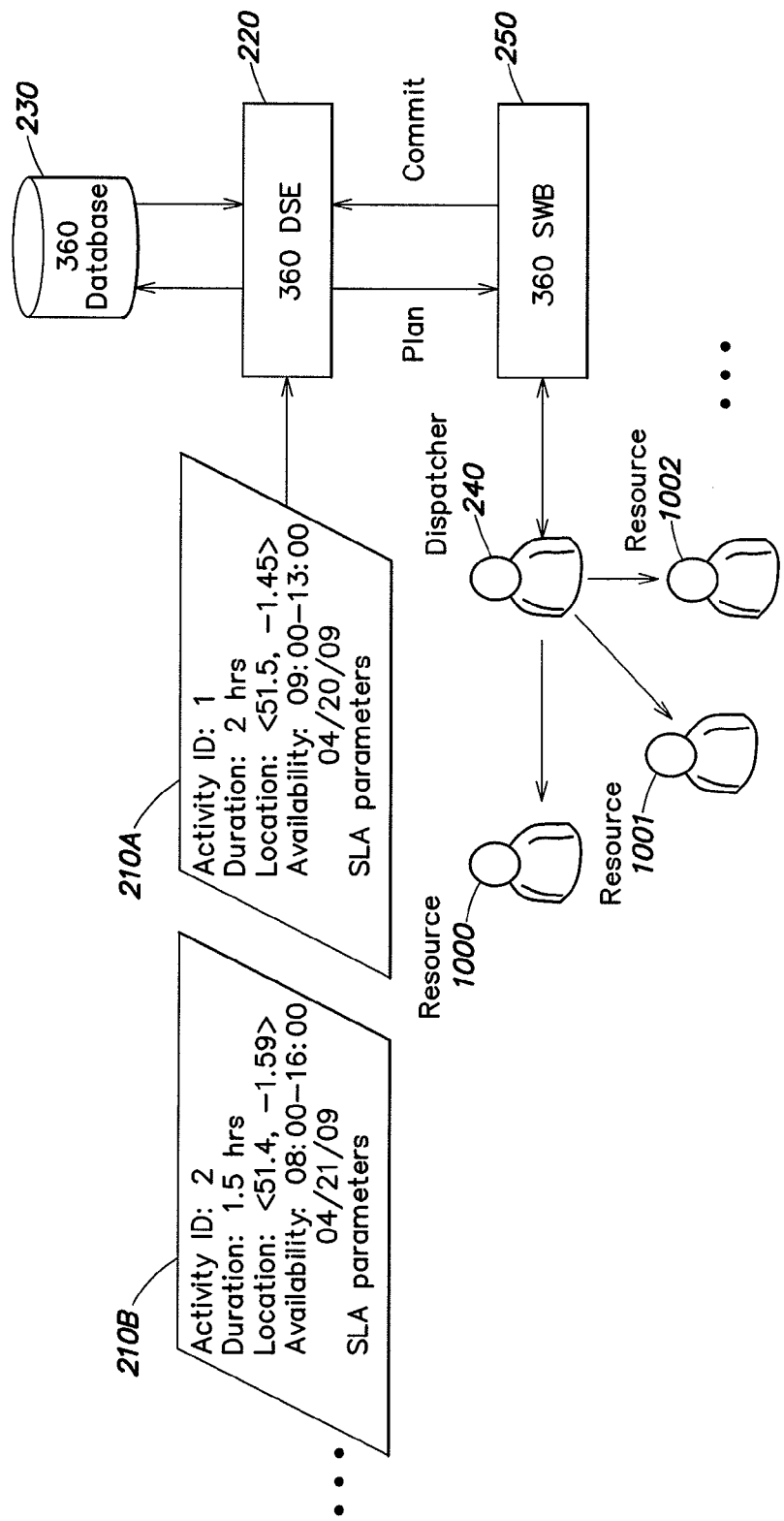
FIG. 2 shows an example of a conventional application of the dynamic scheduling engine 360 DSE.
Figure 3:
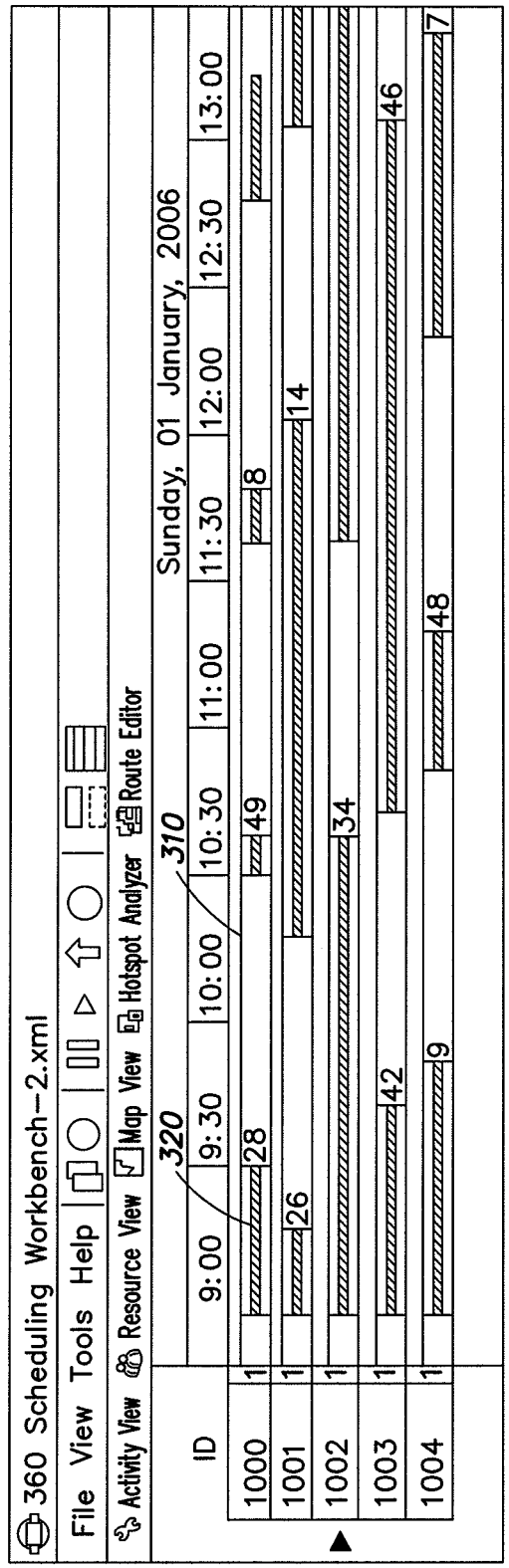
FIG. 3 shows an example of a plan for five resources, presented by 360 SWB in a Gantt chart format.

As discussed above in connection with FIGS. 2 and 3, 360 DSE may be run repeatedly throughout a work day to continually update and improve a current plan for each resource. The plan may indicate a list of activities currently allocated to the resource and a start time currently scheduled for each allocated activity. The dispatcher 240 may review the plan via 360 SWB (shown as component 250 in FIG. 2) and determine whether the plan conforms with relevant business rules and requirements. Once satisfied with the allocation of an activity to a resource, the dispatcher 240 may instruct 360 DSE to commit the activity to the resource, so that 360 DSE will not attempt to re-allocate the activity, even if under future conditions a higher value may be achieved by allocating the activity to a different resource.

The inventors have appreciated that the conventional version of 360 SWB may provide a limited interface to 360 DSE, and that it may be desirable to augment 360 SWB to enable the dispatcher 240 to manipulate the data used by 360 DSE and/or make adjustments to the plans returned by 360 DSE. For example, according to one embodiment of the present invention, a customized 360 SWB (shown as component 470 in FIG. 4) may be provided to enable the dispatcher 240 to manually override an assignment of a locator to a particular activity or to manually change the status of an activity. When such manual intervention occurs, the customized 360 SWB may be programmed to capture and store audit information such as the dispatcher's user ID, a reason code for the change and/or a time stamp indicating when the change is made.

Figure 4A:
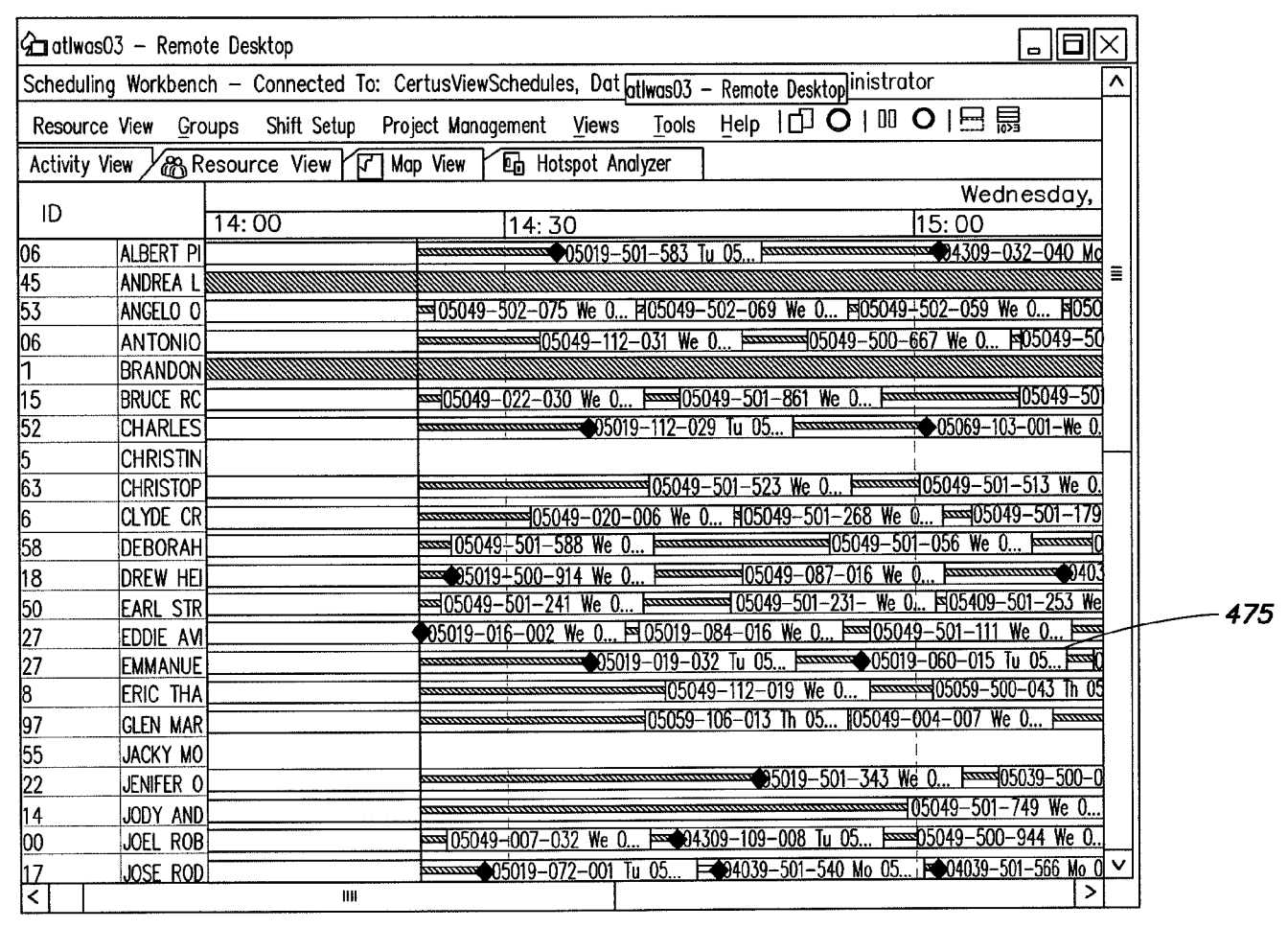

Additionally, or alternatively, the customized 360 SWB may allow the dispatcher 240 to retrieve and view outstanding activities based on due dates. For example, the dispatcher 240 may instruct the SWB to display all activities due on a given day or all activities due in the future (e.g., after a given day). In some embodiments, different visual indicators may be used to indicate an activity's status relative to a due date. For example, in the embodiment shown in FIG. 4A, an activity with a due date already missed or an activity that is not yet due but is not planned to be completed before its due date may be shown with a diamond and/or a particular border type/color (e.g., activity 475 in FIG. 4A).

It should be appreciated that the above examples of modifications to 360 SWB are provided merely for purposes of illustration. Other types of modifications may also be implemented in a customized 360 SWB to provide any desirable functionality for interacting with 360 DSE. For example, some or all of the functionalities provided by the tech dispatch UI may instead be implemented via the customized 360 SWB.

Having committed one or more activities to a resource (e.g., any of resources 1000, 1001, 1002, . . . ) via the customized 360 SWB, the dispatcher 240 may send a notification to a queue manager 480. In some embodiments, the dispatcher 240 may enter into the queue manager 480 information identifying the tickets corresponding to the committed activities, so that the queue manager 480 may retrieve relevant ticket information from the QM database 420 and forward the retrieved information to the resource to whom the activities have been committed. For example, the retrieved information may be transmitted over one or more suitable networks to a personal digital assistant (PDA) carried by the resource.

It should be appreciated that, while multiple activities may be allocated to a resource by a plan produced by 360 DSE, the dispatcher 240 may commit any number of the allocated activities to the resource at any given time. In some embodiments, it may be desirable to commit only one activity (e.g., the next activity to be performed by the resource), so that 360 DSE retains the freedom to re-allocate the rest of the activities on subsequent iterations to obtain a better schedule.

Additionally, committing only a limited number of activities at one time may provide more fine-grained control over the mobile work force and hence improved efficiency. For example, in a conventional field service application, a resource may be given a list of activities to be completed within one shift at the beginning of that shift. Even if the resource is instructed to perform the activities in a certain order, it is often easy for the resource to deviate from the instructions without being detected. For example, the resource may decide to alter a planned route in order to attend to a personal matter, which may result in increased travel time and fuel cost. By contrast, resources may have reduced freedom to deviate from instructions if each resource is given only a few (e.g., one or two) upcoming activities at any given time.

It should also be appreciated that the various components of the system 400 may be implemented in any suitable manner and are not limited to the particular arrangements shown in FIG. 4. For example, the tech dispatch engine 430 and various auxiliary applications such as the tech dispatch UI 460 may be implemented using Structured Query Language (SQL) Server Integration Services (SSIS). Also, any generated schedule information (e.g., the Gantt charts shown in FIG. 3 or 4A) may be transmitted to a remote user interface (not shown) for displaying the schedule information to one or more supervisors of locate technicians.

III. Data Processing

Figure 5:
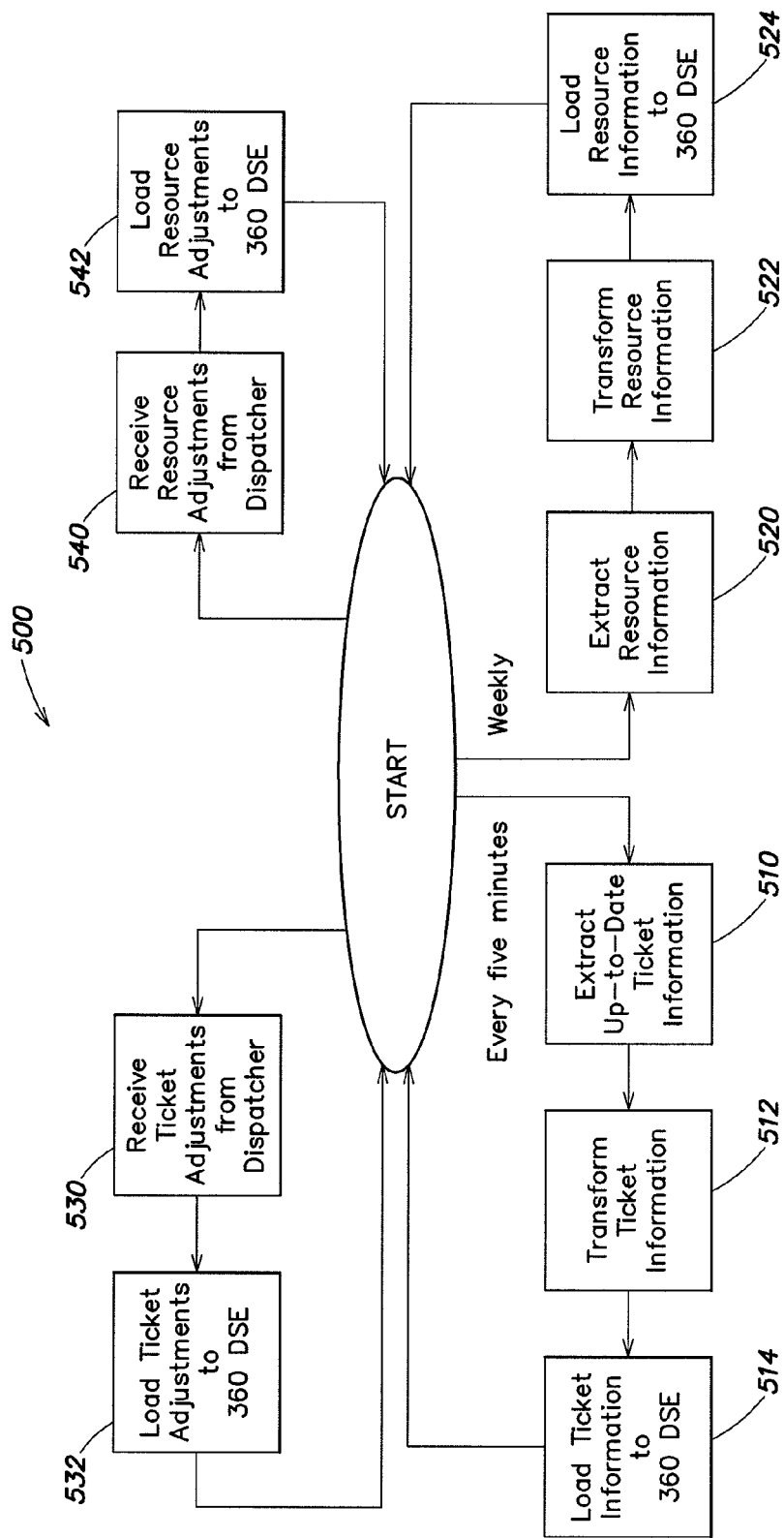
FIG. 5 shows an illustrative process for extracting, transforming and loading information to a dynamic scheduling engine, in accordance with some embodiments of the present invention.

FIG. 5 shows an illustrative process 500 for extracting, transforming and loading information to a dynamic scheduling engine. For example, the process 500 may be performed by the tech dispatch engine 430 (as described above and shown in FIG. 4) to provide inputs to 360 DSE based on ticket and resource information obtained from various sources.

The process 500 may comprise a number of branches, some of which may be taken periodically, while others may be input driven (i.e., triggered by one or more input events). For example, the process 500 may comprise periodic retrieval of information from one or more databases, as well as processing in reaction to inputs from a user via a suitable user interface.

In the embodiment shown in FIG. 5, the process 500 comprises four branches, each of which is a processing loop and is outlined below. Further details regarding these loops are described below in connection with FIGS. 6-13.

A first loop, comprising acts 510, 512 and 514, may be executed periodically and may relate to the processing of ticket information retrieved from a ticket database, such as the QM database 420 shown in FIG. 4. For example, up-to-date ticket information may be retrieved from the ticket database during act 510 and transformed according to appropriate business rules during act 512. The transformed ticket information may then be provided to 360 DSE at act 514.

Similarly, a second loop, comprising acts 520, 522 and 524, may be executed periodically and may relate to the processing of resource information retrieved from a resource database, such as the corporate database 440 shown in FIG. 4. For example, current resource information may be extracted from the resource database during act 520 and transformed according to appropriate business rules during act 522. The transformed resource information may then be provided to 360 DSE at act 524.

In some embodiments, a large number of incoming tickets may arrive throughout a work day, and hence the first loop may be executed frequently (e.g., every five minutes) to ensure that 360 DSE is running based on fresh ticket information. On the other hand, resource information such as company roster and regular shifts may not change as frequently, and therefore may only be updated on a weekly basis. However, it should be appreciated that these specific frequencies are merely exemplary, and that the first and second loops may be executed at any other suitable frequencies or may even be executed at irregular intervals.

The third and fourth loops of the process 500 may relate to inputs received from a user (e.g., the dispatcher 240 shown in FIG. 4) via a suitable interface (e.g., the tech dispatch UI 460 shown in FIG. 4) to make adjustments to ticket and/or resource information. For example, adjustments to ticket information may be received at act 530 and loaded to 360 DSE at act 532. Similarly, adjustments to ticket information may be received at act 540 and loaded to 360 DSE at act 542.

A. Extracting and Transforming Ticket Information

Figure 6:
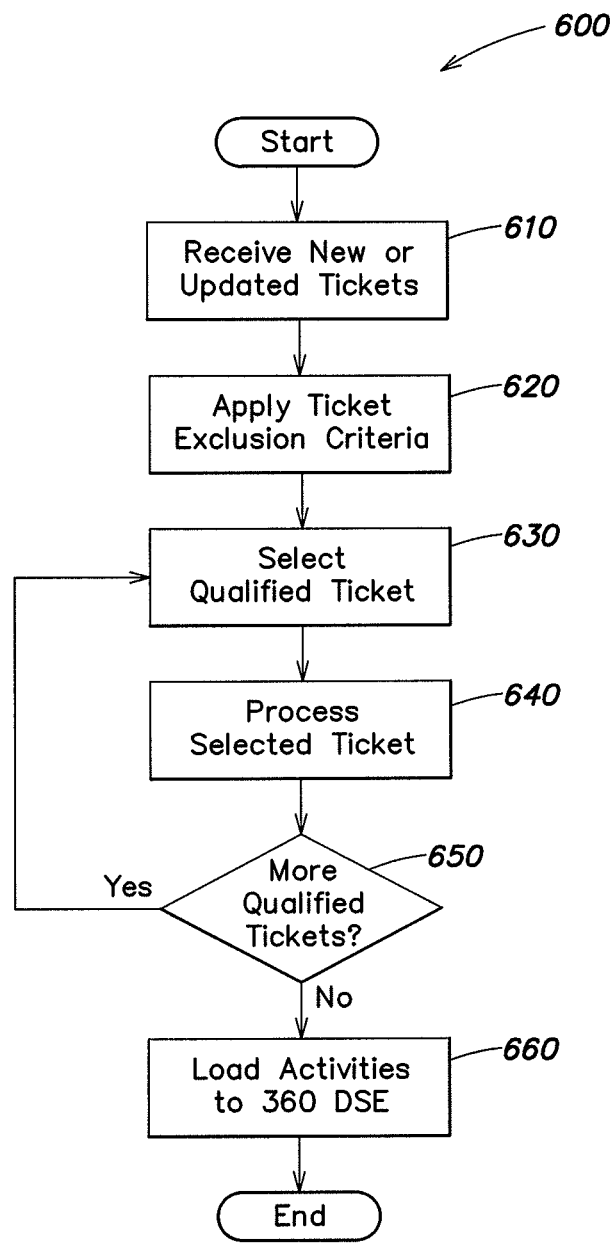
FIG. 6 shows an illustrative process for retrieving and processing incoming ticket information in accordance with some embodiments of the present invention.

Turning to FIG. 6, a process 600 is shown for retrieving and processing incoming locate request ticket information in accordance with some embodiments of the present invention. For example, the process 600 may be executed as part of the first loop of the process 500 as shown in FIG. 5 and discussed above.

At act 610, a ticket database such as the QM database 420 is examined to identify any new tickets/work orders that have arrived or any existing tickets that have been modified (e.g., in the form of work orders). For purposes of the following discussion, any reference to "ticket" applies similarly to "work order" in terms of the relevant ticket information that is stored and available in the ticket database. Once a new or modified ticket is identified, a portion or all of the information relating to that ticket is retrieved from the ticket database for further processing. An illustrative list of information elements that may be retrieved from the ticket database is provided below. However, it should be appreciated that not all of the information elements appearing on this list may be retrieved and that other information elements may retrieved instead of, or in addition to, some of the information elements appearing on this list. Additionally, when not directly available, some of the information elements may be derived from other information elements that are available from the ticket database.

One or more types of underground facilities to be located in connection with the ticket. Some types of underground facilities may be indicated or interpreted as "high profile" or "high risk."

Size of planned excavation area.

Ticket location, given by a pair of lat/long coordinates or a street address together with city and/or county names.

Complexity of ticket location. Some ticket locations may require access permits, such as gated communities, hospitals, or military bases. This information may be derived based on the location of the ticket.

Service category.

1) Normal: Rules for responding to normal tickets may be determined on a state-by-state basis. For example, some states may impose a 48-hour deadline period for responding to a ticket, while others may allow 72 hours, or until 07:00 hours after at least 48 hours but no more than 72 hours.

2) Emergency or short notice: Emergency or short notice tickets may have a significantly shortened deadline period. For example, an emergency ticket may need to be responded to immediately, or within a few hours (e.g., three hours).

3) Project: A project ticket may require multiple visits and/or multiple resources. The number of locate operations required and/or anticipated may be retrieved and the project ticket may be divided accordingly into multiple activities to be scheduled.

4) Meet: A meet ticket may require an appointment with an excavator.

5) Repeat: A repeat ticket may involve re-marking or re-staking a previously completed ticket. Information relating to the prior ticket may be retrieved, such as an identification of the resource who attended to the prior ticket. It may or may not be desirable to dispatch the same resource to the repeat ticket. Depending on the jurisdiction and the particular circumstances, a repeat ticket may be referred to as a renote ticket, a resend ticket, or a re-mark ticket. For example, re-marking may be requested by an excavator because the prior marks have worn off due to weather or are missing due to improper response to the previous ticket. As another example, the prior marks may expire after a certain period time set by state law (e.g., two weeks), in which case a deadline for the repeat ticket may be determined in part by the expiry date of the prior marks.

6) Design: A design ticket may require a comprehensive survey to produce drawings of all underground facilities.

At act 620, one or more ticket exclusion criteria or filters are applied to the tickets retrieved from the ticket database. This removes any tickets that may not be suitable for automatic scheduling. For example, information derived from design tickets may have several unpredictable parameters, such as facility type, duration and skill level, and may therefore be excluded. However, it should be appreciated that other types of tickets may also be excluded instead of, or in addition to, design tickets, and that the types of tickets being excluded may vary between different locate offices depending on different factors such as resource availability and expertise.

Having filtered out certain types of tickets, the remaining qualified tickets may be processed and converted into activities to be scheduled by a dynamic scheduling engine such as 360 DSE. For example, a qualified ticket may be selected at act 630 and processed at act 640. At act 650, it is determined whether there are more qualified tickets to be processed. If the determination is positive, then the process returns to act 630 to select a next qualified ticket to be processed. If the determination is negative, then the process proceeds to act 660 to load to 360 DSE the activities created based on the processed tickets/work orders.

Further details regarding act 640 (i.e., the processing of a qualified ticket) are now described in connection with FIG. 7. As discussed above, 360 DSE expects certain input information elements regarding each activity to be scheduled, such as location, duration, value and SLA parameters. The process 700 shown in FIG. 7 may be performed to collect and/or derive these input elements for a particular qualified ticket.

At act 710, it is determined whether a pair of lat/long coordinates is among the information retrieved from the ticket database for the ticket. If the lat/long coordinates are available, the process 700 proceeds directly to act 730 to consider location-related exclusions. Otherwise, the process 700 may proceed to act 720 to estimate or derive the lat/long coordinates by geocoding an address associated with the ticket. A number of commercially available software applications and/or web services may be employed for geocoding an address, such as ThinkGeo, Google™ Maps API, and Microsoft® Virtual Earth™.

Next, at act 730, additional filtering may be performed based on the location of the ticket to determine whether the ticket is suitable for automatic scheduling. For example, certain city/county exclusions may be applied based on the ticket address, and/or geofence exclusions applied based on the lat/long coordinates. These exclusions express conditions under which a ticket may require special consideration and therefore may not be suitable for automatic scheduling.

Exclusions may be implemented for various reasons such as efficiency, risk management and/or regulatory compliance. For instance, if the ticket location is within a military base, then only U.S. citizens with appropriate security clearances may be dispatched. As another example, certain geographical areas may be inaccessible, or at least difficult to access, during certain time periods. These inaccessibility periods may occur regularly or sporadically, and at any suitable frequency. For instance, heavy traffic may be expected in certain areas during rush hour on every business day, or one or more city blocks may be inaccessible due to a planned event such as a parade or a sports competition. As a further example, the ticket location may be in the proximity of high profile underground facilities (such as optical cables) and/or high profile buildings (such as hospitals). As yet a further example, the ticket location may be within an area associated with higher work complexity (e.g., it may be known that defective tracer wires are present along gas pipers in a certain area, so that more time and/or special equipment may be required). In these circumstances, the ticket may be excluded from automatic scheduling and may instead be dispatched manually.

If the ticket is not excluded at act 730, the process proceeds to act 740 to estimate an activity duration to be provided to 360 DSE. A number of factors may be taken into account when estimating a duration, such as the types of facilities to be located and the size of the excavation area. A regional complexity may also be determined based on the ticket location. For example, it may be determined whether the ticket location is in a sparse rural area or a dense urban or industrial area, and the estimated duration may be adjusted accordingly. Historical information may also be taken into account, such as an average duration calculated based on actual durations of previously completed tickets of a particular type. Additionally, historical information may be maintained for different locate offices and applied accordingly.

Proceeding to act 750, a base value may be assigned to the ticket to reflect its importance or priority relative to other tickets. As discussed above, 360 DSE aims to find a schedule that maximizes overall value, so that a ticket with a higher base value may be scheduled ahead of a ticket with a lower base value.

Following below is a non-exhaustive list of example base values in accordance with some embodiments. It should be appreciated that these specific values are provided solely for the purpose of illustration, and that other choices of values may also be suitable.

In some embodiments, a base value may be determined based on a service category as discussed above in connection with FIG. 6. For example, an emergency ticket or a renote/resend/re-mark ticket may be assigned a base value of 900, whereas a short notice ticket may be assigned a base value of 800 and a normal ticket may be assigned a base value of 700. As another example, a damage or dig-up ticket (e.g., for repairing damage to an underground facility) may be assigned a base value of 900.

In some embodiments, the types of facilities to be located may also be taken into account when determining base values. For example, a high profile facility type such as optical cables may be assigned a base value of 1300.

In some embodiments, different base values may be assigned depending on jurisdiction and/or locate office. For example, for some jurisdiction and/or locate office, a base value of 700 may be assigned to all tickets, regardless of service category. As another example, for some jurisdiction and/or locate office, tickets associated with high profile facilities may be assigned a base value of 700, instead of a global default value of 1300 for high profile facilities.

At acts 760 and 770, additional weightings may be applied to the base value obtained during act 750. For example, it may be determined at act 760 that the ticket is an emergency ticket or a high-risk ticket (e.g., a ticket with increased potential liability due to the associated facility type, such as optical communication cables). If the determination is positive, the ticket value may be scaled up by an appropriate weighting factor (e.g., a factor of 3.0) at act 770, to encourage 360 DSE to prioritize the ticket over other tickets. If, on the other hand, the determination at act 760 is negative, the process 700 may proceed directly to act 780 without applying any additional weighting factors.

It should be appreciated that weighting factors may be applied for many suitable reasons in addition to, or instead of, the ones mentioned above. For example, weighting factors may be determined based on client contract, or excavation reason (e.g., building construction, demolition, utility installation, utility repair and/or landscaping). A suitable weighting factor may be chosen for any of these reasons to encourage or discourage prioritization of relevant tickets.

More generally, base values and/or weighting factors may be derived based on one or more of a number of parameters that may bear upon prioritization of activities to schedule. As discussed above, examples of such parameters include, but are not limited to: job performance information (e.g., information regarding scheduled activities already in progress, such as actual performance time as compared to estimated performance time, which may in some instances be obtained from instrumentation/equipment employed to perform activities); quality assessment information (e.g., information regarding quality of previously scheduled activities or activities already in progress); weather information relating to weather conditions associated with the locate activity; traffic information relating to traffic conditions associated with the locate activity; risk information associated with the locate activity (e.g., cost/danger associated with potential damage of one or more facilities present); penalty or profitability information associated with the locate activity (e.g., significant penalty associated with non-performance/non-completion of the locate activity pursuant to the ticket; different price points for different activities/parties contracting for performance); and complexity information (e.g., restricted access, high profile facility, certain tools/equipment required for locate activity, particular traffic restrictions/patterns, etc.).

With respect to any of the information discussed herein on which one or more parameters that bear upon scheduling may be based, the methods, apparatus and systems disclosed herein may access such information via the Internet, a variety of databases or other systems, or any other suitable source, for example, on an as-needed or periodic basis. In particular, while not shown specifically in FIG. 4, the tech dispatch engine 430 may be coupled to one or more sources of information, for example via one or more networks, and configured to receive various information from not only the queue manager database 420 and the corporate database 440 but other sources as well. For example, with respect to weather and traffic information, in some exemplary implementations the tech dispatch engine 430 may acquire such information from the Internet. With respect to quality, risk, penalty, profitability, and/or complexity information, this information may be generated and/or analyzed pursuant to some of the inventive concepts discussed herein by the tech dispatch engine itself, and/or may be acquired from various external sources and used "as-is" to implement some of the scheduling concepts disclosed herein (e.g., entities dispatching technicians may have other systems in place to assess quality, risk, penalty or profitability, and/or complexity, for example associated with various activities). Examples of methods, apparatus and systems for assessing activities to be scheduled and providing information relating to risk, penalty or profitability and/or complexity, for example, are discussed in U.S. Provisional Patent Application No. 61/220,491, filed Jun. 25, 2009, entitled, "Methods and Apparatus for Assessing Field Service Operation Tickets," which application is incorporated herein by reference.

In other exemplary implementations, base values and/or weighting factors also or alternatively may be based at least in part on other parameters discussed above including, but not limited to, contractual obligations (e.g., between the entity dispatching technicians and responsible for/overseeing the activities, and one or more parties for which the activity/activities is/are being performed), statutory and/or regulatory requirements (e.g., wage and hour compliance for resources, and/or the time and/or manner in which a given activity needs to be performed pursuant to applicable statutes/regulations), best practices (e.g., established by a relevant industry in connection with the performance of one or more activities), and/or standard operating procedures (e.g., relating to practices of an entity dispatching technicians and/or one or more parties for which activities are performed). Some such parameters may relate particularly to the type of activity requested in a ticket, and hence may be utilized in connection with the processing of ticket information by the tech dispatch engine 430. In other instances, such parameters additionally or alternatively may relate to resources, and hence may be utilized in connection with the processing of resource information by the tech dispatch engine 430, as discussed further below.

For example, pursuant to one or more of contractual obligations, applicable statutes and/or regulations, best practices and/or standard operating procedures, a given resource may only be allowed to work for certain amounts of time in a given period (e.g., eight hours per calendar day), and with specified limitations on overtime (e.g., maximum two hours overtime per calendar day), frequency and duration of breaks in a given period (e.g., three 15 minute breaks per calendar day and a half-hour lunch), maximum/minimum contiguous working blocks (e.g., no more than four hours worked continuously without a break), and the like, any or all of which circumstances may bear upon the availability of that resource at any given time and hence the allocation of activities to available resources as part of a scheduling process. This in turn may affect the assigned base value and/or weighting factor.

In yet other aspects, base values and/or weighting factors also or alternatively may be based on other attributes relating to available resources, such as a skill level or particular certification of a technician, historical efficiency of a technician in attending to activities, assignment of a given resource to a particular functional/operational unit (and in some instances the period of time for such an assignment, i.e., for a day, for a week, for a month, etc.), and/or available inventory needed to attend to activities (e.g., is inventory available in technician's vehicle, at a warehouse, available next day, not available in near-term, etc.). For example, a given technician may be qualified, based on experience and training, to do sophisticated and/or high risk activities (e.g., locate and mark large gas mains), or a given technician may be particularly certified to do a certain type of activity, and/or have particular clearance to do a certain type of activity and/or enter into a certain location/area in which an activity needs to be performed. In yet another example, a technician may be assigned to a particular functional/organization unit on a given day or days of the week dedicated to only a particular type of activity, and on other days or in other weeks be assigned to a different organizational unit and/or designated to do only a particular different type of activity (e.g., Monday—locate and mark gas; Tuesday—locate and mark electric; Thursday—team 1 covering activities in geographic zone A; Friday—team 3 covering activities in geographic zone B). Parameters that bear upon scheduling may be derived from any one or more of these exemplary attributes and circumstances.

Any one or more of the above-identified parameters, alone or in combination, as well as other parameters relating to resources and/or activities to be scheduled, may be employed according to various embodiments of the present invention to improve scheduling. In one aspect, different parameters may be weighted differently so as to affect scheduling outcomes in different manners, and combinations of differently weighted parameters may be employed to affect scheduling outcomes. Furthermore, according to other aspects, improved scheduling may be based on considering one or more such parameters a priori as part of a scheduling process, and/or providing one or more such parameters in essentially real-time or regularly/periodically as part of an iterative scheduling process to periodically/continually refine schedules and reallocate resources to activities if necessary. Furthermore, one or more of the above-described parameters may not only be used to determine base values and or weighting factors, but to define at least in part SLA curves, as discussed in greater detail below.

At act 780, a set of SLA parameters are determined for the current ticket. As discussed above, the SLA parameters for an activity may determine one or more time-varying SLA curves over certain intervals of time, to indicate the revenue that would be generated by completing the activity at any point within those intervals. Thus, SLAs are one of the main tools provided by 360 DSE for modeling various business rules as they apply to the different activities to be scheduled by 360 DSE. For example, shifting an SLA curve upward (or, equivalently, increasing the revenue generated by the corresponding activity) may cause 360 DSE to schedule the activity ahead of other activities to capture the higher value. As an other example, modifying the shape of an SLA curve may cause 360 DSE to change the time at which the corresponding activity is scheduled, again to maximize value.

Thus, the revenue associated with an activity need not correspond to the actual monetary payment received from a customer for performing the activity. Rather, the revenue may simply be a numerical value that can be manipulated to encourage 360 DSE to produce schedule plans according to certain business rules. For example, assigning to an activity a higher revenue before a deadline and a lower revenue after a deadline may encourage 360 DSE to schedule the activity before the deadline. Similarly, a higher revenue may be assigned to an older activity (i.e., an activity that has been available for some time but is not yet performed) to encourage 360 DSE to prioritize the older activity over newer activities. As discussed further below, this may be achieved by associating an aging factor with the SLA curve so that the SLA curve is scaled up each day based on the aging factor.

Figure 8:
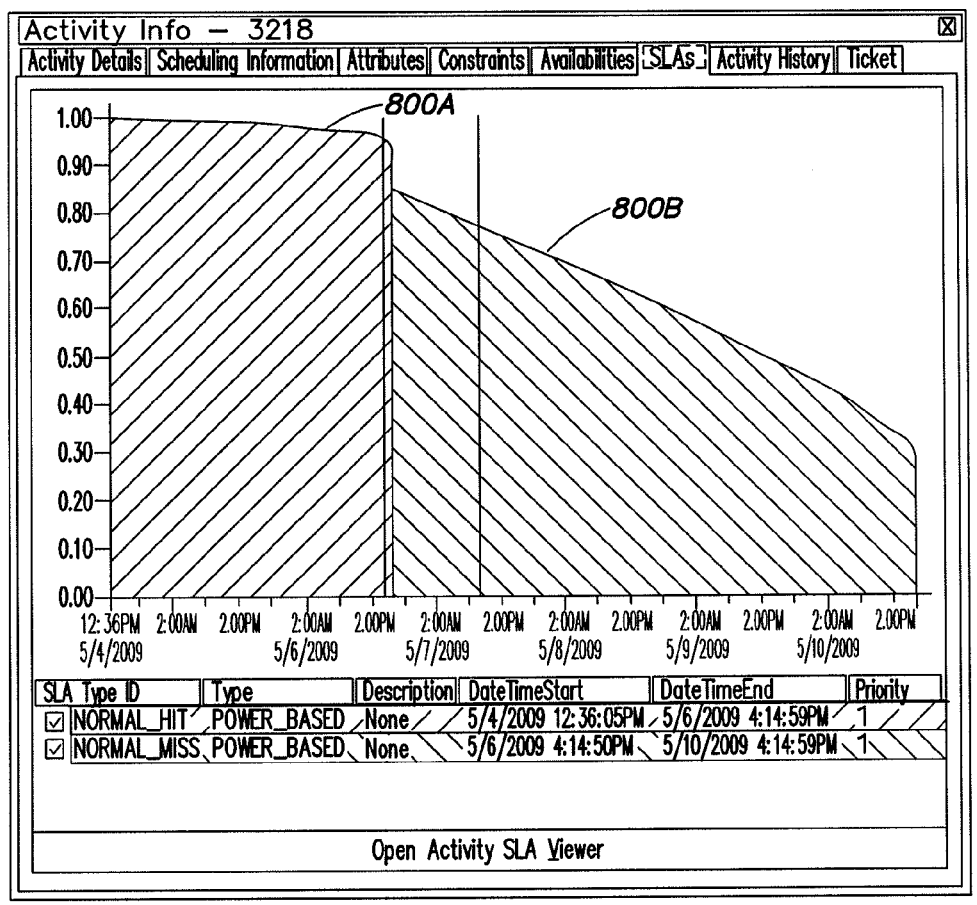
FIG. 8 shows examples of two SLA curves defined respectively using a NORMAL_HIT type and a NORMAL_MISS type, in accordance with some embodiments of the present invention.

Examples of techniques for defining SLA parameters are described in detail below in connection with FIGS. 8-10. Any suitable combination of these techniques may be used in act 780 of FIG. 7 to define SLA parameters for a ticket. However, other techniques may also be suitable, as the embodiments discussed herein are not limited to the use of any particular techniques for defining SLA parameters.

360 DSE supports three SLA mechanisms: straight line, Gaussian and power-based. The straight line mechanism produces a horizontal line representing a constant activity base value, and the Gaussian mechanism produces a bell-shaped curve with a maximum determined by the activity base value. Further details regarding these two mechanisms can be found in the appendix "360 Concepts Guide 4.9.6, User Guide."

The third SLA mechanism, i.e., power-based, can be used to produce an upward or downward sloping curve whose slope and/or curvature may be adjusted by varying appropriate parameters in the SLA type definition.

In some embodiments, two or more different SLA curves may be specified for a given activity and may be "pasted" together in time. Such an example is show in FIG. 8, where a first power-based SLA curve 800A is specified for an activity for the time period starting at 12:36:05 PM, May 4, 2009 and ending at 4:14:59 PM, May 6, 2009, and a second power-based SLA curve 800B is specified for the same activity for the time period starting at 4:14:59 PM, May 6, 2009 and ending at 4:14:59 PM, May 10, 2009. Thus, as far as 360 DSE is concerned, the value of the activity is governed by the SLA curve 800A before the switch-over time at 4:14:59 PM, May 6, 2009, and by the SLA curve 800B after the switch-over time.

The technique of pasting together SLA curves may be employed to model changes in the status of an activity and to cause 360 DSE to behave differently in response to the status changes. For example, in the embodiment shown in FIG. 8, the switch-over time at 4:14:59 PM, May 6, 2009 may correspond to a deadline by which the activity should have been completed. The SLA curves 800A and 800B may be defined respectively using a "NORMAL_HIT" curve type and a "NORMAL_MISS" curve type. Illustrative definitions of these curve types are given below in XML format.

```
<SLA_TYPE>
<id>NORMAL_HIT</id>
<mechanism_type>POWER_BASED</mechanism_type>
```

```xml
<start_proportion>1</start_proportion>
<end_proportion>0.85</end_proportion>
<curve_shape>0.1</curve_shape>
<activity_aging_factor>1.2</activity_aging_factor>
</SLA_TYPE>
<SLA_TYPE>
<id>NORMAL_MISS</id>
<mechanism_type>POWER_BASED</mechanism_type>
<start_proportion>0.85</start_proportion>
<end_proportion>0.3</end_proportion>
<curve_shape>0.8</curve_shape>
<activity_aging_factor>2</activity_aging_factor>
<SLA_TYPE>
```

The XML code above defines the SLA curve types NORMAL_HIT and NORMAL_MISS. Examples of instantiations of these curve types are given below, corresponding to the SLA curves 800A and 800B shown in FIG. 8.

```xml
<Activity_SLA>
<sla_type_id>NORMAL_HIT</sla_type_id>
<activity_id>1</activity_id>
<datetimestart>2009-05-04T12:36:05+00:00</datetime_start>
<datetimeend>2009-05-06T16:14:59+00:00</datetime_end>
</Activity_SLA>
<Activity_SLA>
<sla_type_id>NORMAL_MISS</sla_type_id>
<activity_id>1</activity_id>
<datetimestart>2009-05-06T16:14:59+00:00</datetime_start>
<datetimeend>2009-05-10T16:14:59+00:00</datetime_end>
</Activity_SLA>
```

As discussed above, the deadline associated with each activity may vary depending on state, and the manner in which the deadline is applied may also vary for different locate offices. For example, a state may set the deadline to be midnight after 48 hours have elapsed since the ticket is issued. However, since technicians may not be working in the evenings, the effective deadline for the ticket may be the end of a normal shift prior to the actual deadline. Thus, in the example shown in FIG. 8, the deadline imposed by the state may be midnight on May 7, 2009, since the ticket is issued at 12:36:05 PM on May 4, 2009. On the other hand, the effective deadline may be 4:14:59 PM on May 6, 2009, which is 15 minutes before the end of the normal shift for that day (assuming that the expected duration for the ticket is 15 minutes). As a result, the NORMAL_HIT SLA 800A is set to expire at 4:14:59 PM on May 6, 2009, after which the NORMAL_MISS SLA 800B applies.

To capture the specific business rules regarding ticket deadlines, the processing of each incoming ticket (e.g., during act 780 of process 700 shown in FIG. 7) may comprise determining an effective deadline and using the effective deadline to determine SLA start and/or end times. This may be done in any suitable manner, for example, by applying a logic similar to the one discussed above relating to shift end times.

Furthermore, in this example, the NORMAL_MISS SLA 800B is set to expire four days after it comes into effect. 360 DSE will no longer attempt to schedule the activity after the SLA 800B expires, and the activity may need to be scheduled manually. This may reflect a business rule that reasonable attempts should be made to respond to a ticket even after the deadline for the ticket has been missed. However, it should be appreciated that the setting of four days is merely exemplary.

Any other length of time may also be chosen, for example, according to management preferences for a particular locate office.

Returning to the definition of SLA type NORMAL_HIT, a start_proportion parameter is set to 1, indicating that the left end point of an SLA curve defined using NORMAL_HIT will have a value equal to a base value associated the corresponding activity. Similarly, an end_proportion parameter for NORMAL_HIT is set to 0.85, indicating that the right end point of an SLA curve defined using NORMAL_HIT will have a value equal to 0.85 times the base value associated the corresponding activity. For example, as shown in FIG. 8, the SLA curve 800A defined using NORMAL_HIT with base value 1 has a starting value of 1 and an ending value of 0.85. In other words, the revenue generated by completing the activity drops by 15 percent over the lifetime of the SLA curve 800A, which may encourage 360 DSE to schedule the activity before the end of the SLA curve 800A (i.e., before an effective deadline corresponding to the end of the SLA curve 800A).

The definition of NORMAL_HIT also includes a "curve_shape" parameter, which may be a real number between 0 and 1. Generally, a curve shape parameter close to 1 may result in an SLA curve with a steady drop (or rise) from the starting value to the ending value. By contrast, a curve shape parameter close to 0 may result in an SLA curve with a sharp drop (or rise) near the end. In this example, the curve shape parameter for NORMAL_HIT is set to 0.1, so that the SLA curve 800A has a gentle downward slope (e.g., a negative slope of no more than 0.5) until shortly before the end (i.e., shortly before 4:14:59 PM on May 6, 2009), after which the revenue drops drastically (e.g., with a negative slope of at least than 2), ending at 0.85. Thus, 360 DSE may have little incentive to schedule the activity early, but may have more incentive to do so before the end of the SLA curve 800A.

For the SLA type NORMAL_MISS, the start_proportion and end_proportion parameters are set to 0.85 and 0.3, respectively, and the curve_shape parameter is set to 0.8. As a result, the SLA curve 800B has a steady drop from 0.85 to 0.3 over its lifetime. This may encourage the 360 DSE to schedule the activity as soon as possible, as the deadline for the activity has already been missed.

An "activity_aging_factor" parameter of 1.2 is also specified for NORMAL_HIT, indicating that the base value of an SLA curve defined using NORMAL_HIT will be scaled up by a factor of 1.2 each time the corresponding activity enters a new calendar day without being completed. This is illustrated in FIGS. 9A and 9B.

Figure 9A:
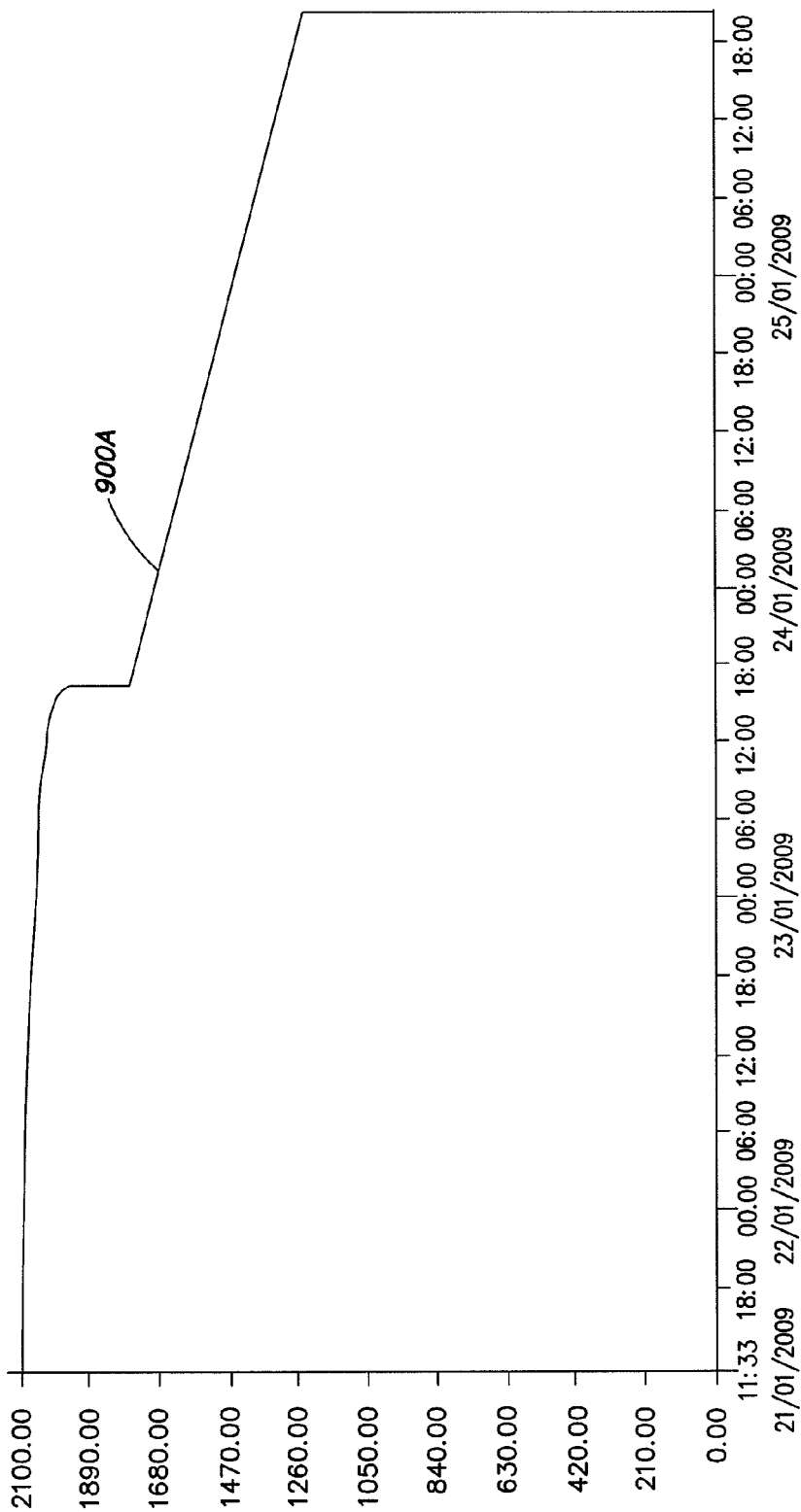
FIGS. 9A and 9B show an example of an SLA curve being scaled up based on an aging factor, in accordance with some embodiments of the present invention.
Figure 9B:
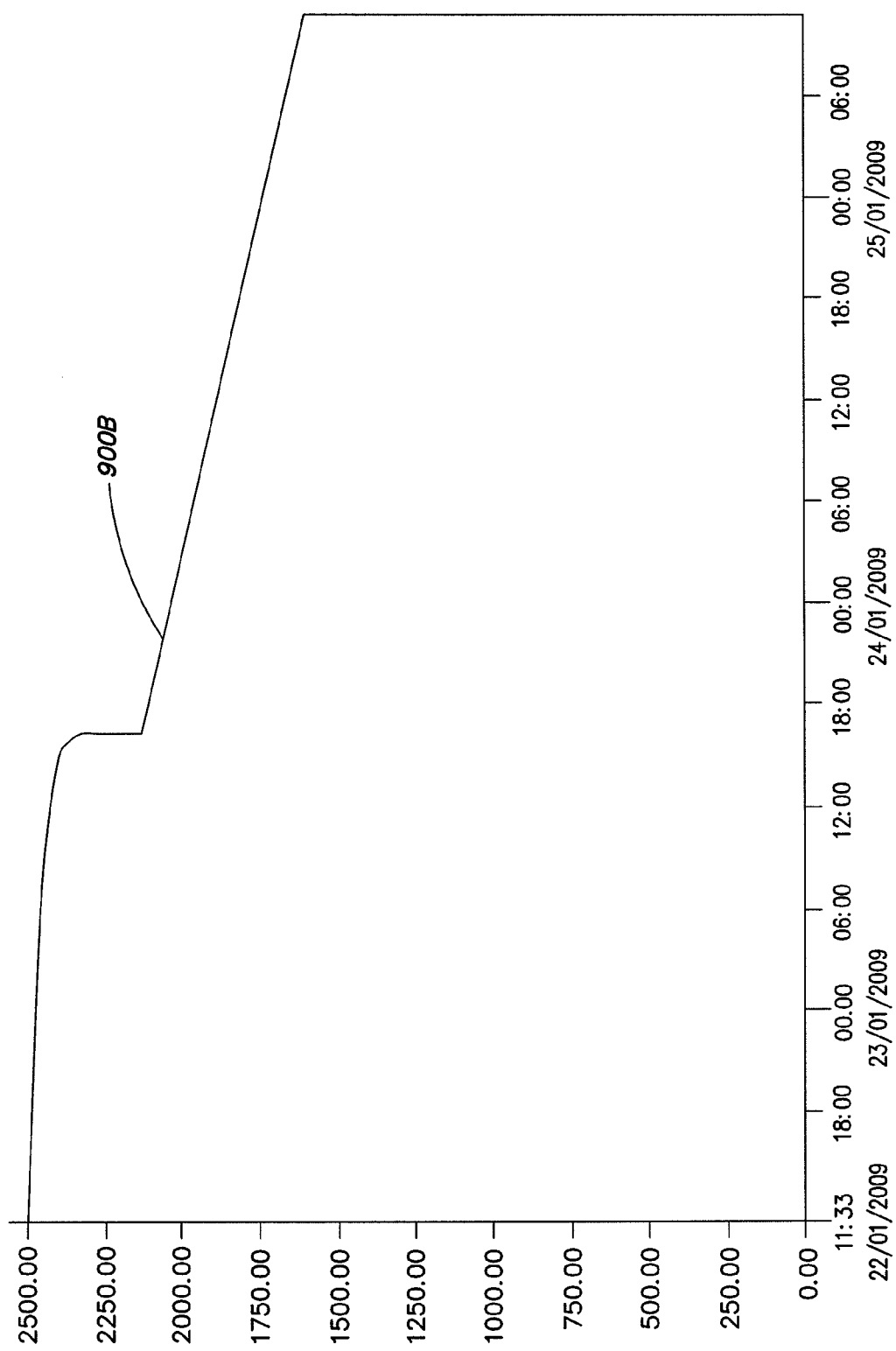

FIG. 9A shows an example of an SLA curve 900A defined using NORMAL_HIT with a base value of 2100 at 11:33 hours on Jan. 21, 2009. FIG. 9B shows the SLA curve 900B for the same activity at 11:33 hours on Jan. 22, 2009 (i.e., 24 hours later), assuming the activity has not been completed. As shown in FIG. 9B, the base value has been increased to 2500, which is about 1.2 times the initial base value of 2100. Thus, 360 DSE may be encouraged to schedule the activity ahead of newer activities, even if they have the same initial base value (e.g., 2100) at the beginning of their SLAs.

Similarly, the NORMAL_MISS SLA definition specifies an activity_aging_factor parameter of 2, which increases the base value even more rapidly over time. This may in turn encourage 360 DSE to schedule an activity that is several days overdue ahead of most other activities and, in some instances, even the activities indicated as being urgent.

In addition to NORMAL_HIT and NORMAL_MISS, SLA types may also be defined for emergency activities. For example, an URGENT_HIT SLA type and an URGENT_MISS SLA type may be defined as follows.

```
<SLA_TYPE>
  <id>URGENT_HIT</id>
  <mechanism_type>POWER_BASED</mechanism_type>
  <start_proportion>1</start_proportion>
  <end_proportion>0.8</end_proportion>
  <curve_shape>0.8</curve_shape>
  <activity_aging_factor>2</activity_aging_factor>
</SLA_TYPE>
<SLA_TYPE>
  <id>URGENT_MISS</id>
  <mechanism_type>POWER_BASED</mechanism_type>
  <start_proportion>0.8</start_proportion>
  <end_proportion>0.3</end_proportion>
  <curve_shape>0.8</curve_shape>
  <activity_aging_factor>2</activity_aging_factor>
<SLA_TYPE>
```

Figure 10:
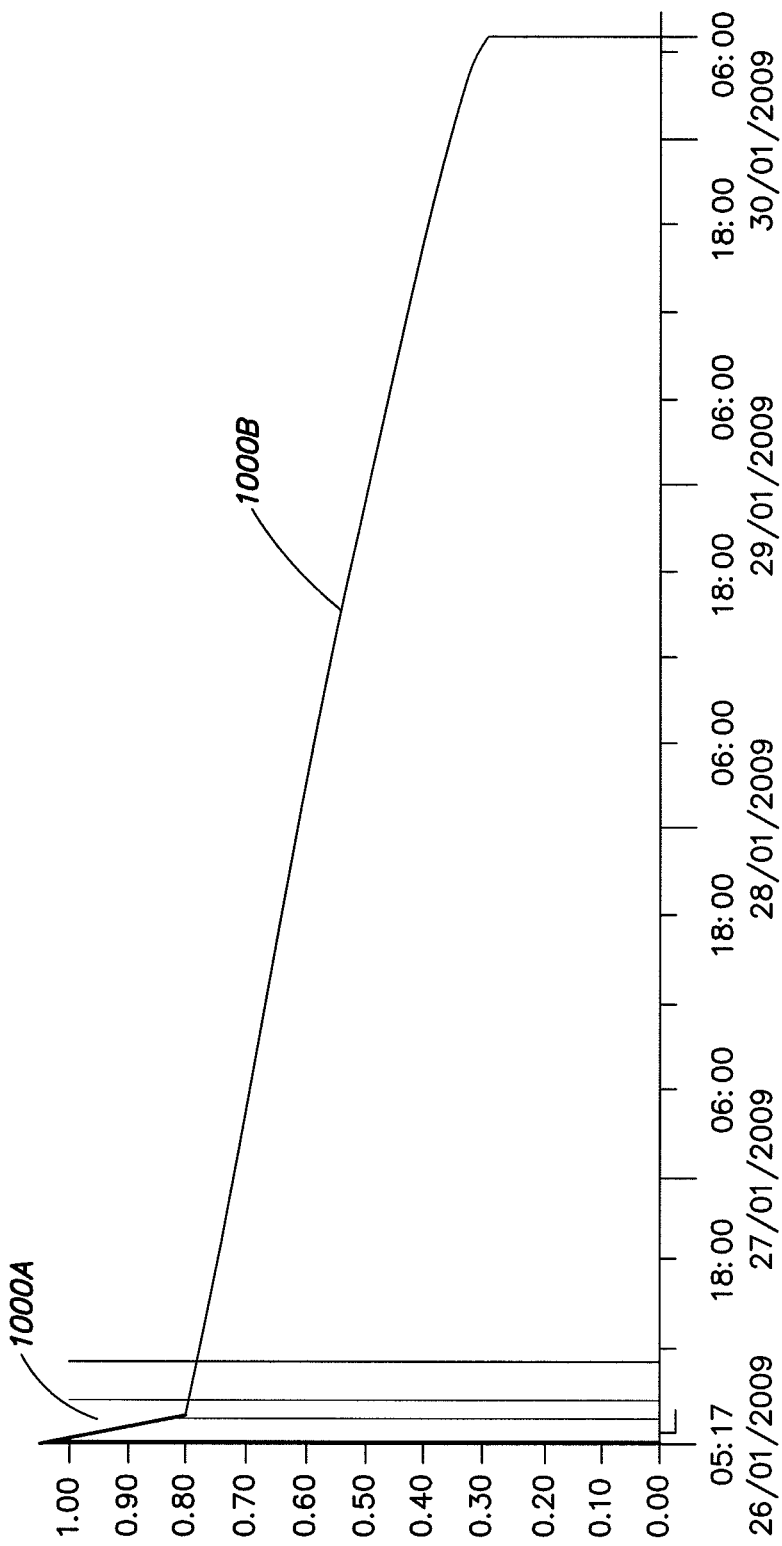
FIG. 10 shows examples of two SLA curves defined respectively using an URGENT_HIT type and an URGENT_MISS type, in accordance with some embodiments of the present invention.

FIG. 10 shows an example of an SLA curve 1000A defined using URGENT_HIT and an SLA curve 1000B defined using URGENT_MISS. In this example, the SLA curve 1000A is defined over a very short time period (e.g., two hours) to encourage 360 DSE to schedule the corresponding emergency activity as soon as possible. Although not shown, the emergency activity may be assigned a high base value (e.g., 8100), further encouraging 360 DSE to prioritize emergency activities over other types of activities. In some embodiments, the value assigned to an emergency activity may be even higher than the value assigned to planned breaks for resources, so that breaks may be forgone in favor of an emergency activity.

Since the URGENT_MISS type is defined using similar parameters as the NORMAL_MISS type, the SLA curve 1000B may have a similar shape compared to an SLA curve of the NORMAL_MISS type. However, the SLA curve 1000B may begin with a higher base value (e.g., 6480, or 0.8 times 8100), and the corresponding missed emergency activity may be scheduled by 360 DSE ahead of a missed normal activity (except possibly when the missed normal activity is several days overdue).

Having described several examples of SLA definitions that may be used in transforming ticket information into input parameters to 360 DSE, it should be appreciated that the specific parameter values discussed above are merely exemplary. Other parameter values may also be suitable, for example, to model different business rules and considerations. In particular, as noted above, examples of other parameters that may be used, alone or in combination, to define at least in part an SLA include, but are not limited to, job performance information, quality assessment information, weather information, traffic information, risk information, penalty or profitability information, and/or complexity information relating to activities, as well as skill level or particular certification of technicians, historical efficiency of technicians in attending to activities, and/or available inventory needed to attend to activities. Yet other exemplary parameters may relate to information regarding contractual obligations, statutory and/or regulatory requirements, industry best practices, standard operating procedures of one or more entities/parties, and the like.

B. Extracting and Transforming Resource Information

In addition to ticket information, resource information may also be retrieved from a database and transformed into input parameters to a scheduling engine such as 360 DSE. For example, as discussed in connection with FIG. 4, a tech dispatch engine 430 may retrieve resource information such as shift and skill level information from a corporate database 440, and may provide inputs to 360 DSE based on the retrieved resource information. A number of parameters already were introduced and discussed above relating to some aspect of resource attributes and/or availability, which parameters may affect the prioritization with which activities are scheduled (e.g., pursuant to base values, weighting factors, and SLA definition). Following below are some illustrative examples of extracting and transforming certain resource information, which may be applied more generally to any available information regarding resources.

Figure 11:
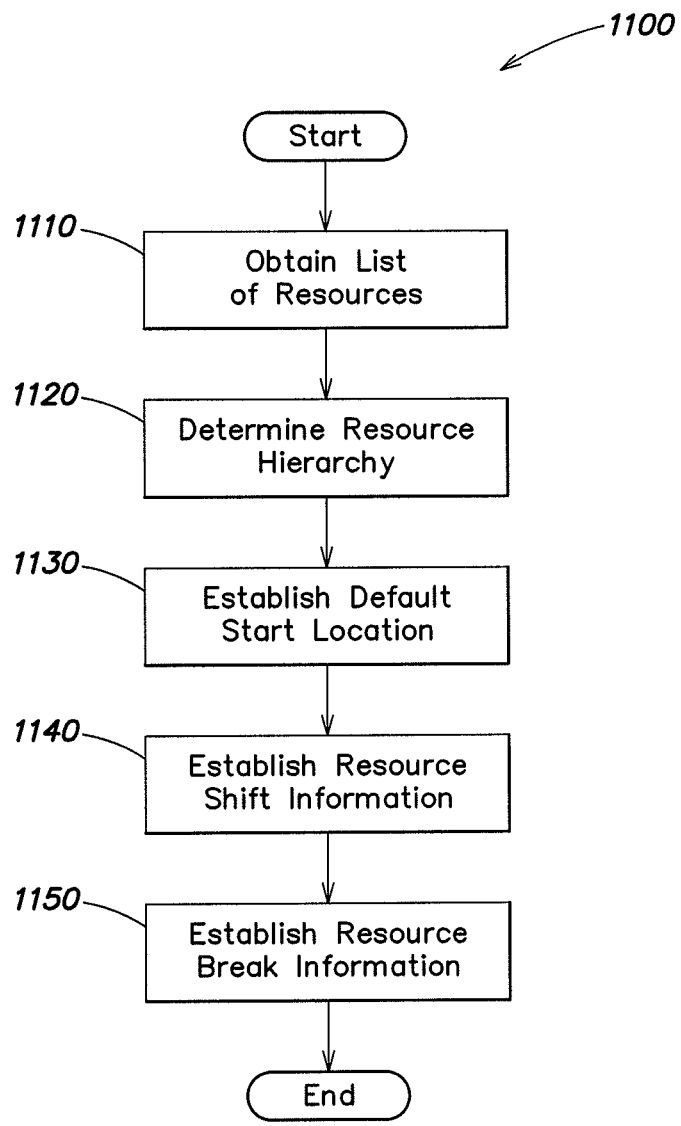
FIG. 11 shows an example of a process for extracting and transforming resource information, in accordance with some embodiments of the present invention.

FIG. 11 shows an example of a process 1100 that may be performed by the tech dispatch engine 430 to extract and transform resource information. Additionally, the process 1110 may be executed as part of the second loop of process 500 as shown in FIG. 5.

At act 1110, a list of resources available for scheduling may be obtained from a suitable source, such as a payroll system (e.g., in the corporate database 440 shown in FIG. 4) and/or a ticketing system (e.g., in the QM database 430 shown in FIG. 4). Then, at act 1120, a hierarchy among the resources may be determined based on data retrieved from the ticketing system. For example, resources may be grouped based on the different locate offices to which they are affiliated. Additionally, some resources may be identified as supervisors and may not be made available for automatic scheduling by the dynamic scheduling engine. In yet another aspect, some resources may be indicated as having special certification and/or skill sets for different types of locate activities, and grouped accordingly based on data retrieved from the ticketing system. As also noted above, one or more of contractual obligations, applicable statutes and/or regulations, best practices and/or standard operating procedures may provide constraints on the availability of resources, as well as historical efficiencies, assignment of given resources to a particular functional/operational unit (and in some instances the period of time for such an assignment, i.e., for a day, for a week, for a month, etc.), and/or available inventory needed to attend to activities (e.g., is inventory available in technician's vehicle, at a warehouse, available next day, not available in near-term, etc.).

At act 1130, a default start location may be established for each resource. For example, the default start location may be the locate office to which the resource is affiliated. As discussed below, the start location may be manually and dynamically adjusted by a dispatcher. However, the default location may be provided to 360 DSE when no such manual adjustments are made.

Continuing to act 1140, a default shift pattern may be established for each resource. For example, some resources may have normal shifts from 7:00 hours to 15:45 hours each day between Monday and Friday, while some other resources may have normal shifts one hour later, i.e., from 8:00 hours to 16:45 hours, on the same days. Additionally, some other resources may be floaters that are utilized under certain circumstances only, for example, when all other resources are occupied or when an activity requires travelling to a remote area. Yet some other resources may be "on call" outside their normal shifts, but may require overtime pay when assigned activities outside their normal shifts.

At act 1150, default breaks may be established for each resource. For example, a resource may receive a 45-minute break at some predetermined time during each shift. Alternatively, the 45-minute break may be scheduled by 360 DSE and may be assigned a value higher than normal activities (e.g., 6000). Thus, 360 DSE is encouraged to schedule the break even when some normal activities remain to be completed.

Additionally, some resources may have other regular breaks such as training sessions and/or doctor's appointments.

C. Manually Adjusting Ticket and/or Resource Information

In some embodiments, a dispatcher may manually make different types adjustments to the ticket and/or resource information provided to the dynamic scheduling engine. Several examples of manual adjustments are described below in connection with FIGS. 12 and 13. However, it should be appreciated that the various embodiments described herein are not limited to these specific types of manual adjustments. Other types of adjustments may also be made in any suitable manner, for example, by interacting with the tech dispatch UI 460 and/or the customized 360 SWB as shown in FIG. 4.

Figure 12:
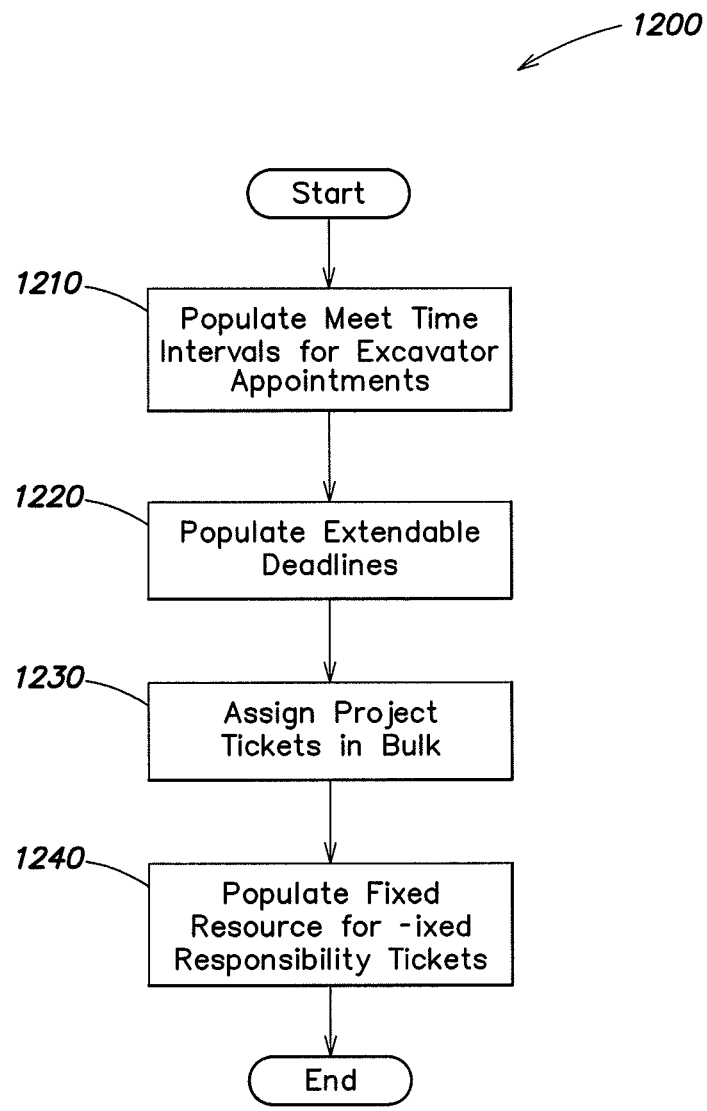
FIG. 12 shows an example of a process for adjusting the ticket information provided to a dynamic scheduling engine, in accordance with some embodiments of the present invention.

FIG. 12 shows an example of a process 1200 for adjusting the ticket information provided to 360 DSE, which may be performed as part of the third loop of the process 500 as shown in FIG. 5.

At act 1210, the dispatcher may identify any ticket that involves an excavator appointment and may populate meet time intervals for the corresponding activity based on the appointment arranged with the excavator. For example, the activity may be specified to 360 DSE as being available only during the meet time intervals.

At act 1220, the dispatcher may identify any ticket that is potentially eligible for a deadline extension. For each such ticket, the dispatcher may populate an extendable deadline by overwriting the existing deadline used by 360 DSE.

Continuing to act 1230, the dispatcher may assign project tickets (i.e., tickets that each comprise multiple activities) in bulk to a resource or a group of resources (e.g., those reporting to a common supervisor). Once a project is assigned, 360 DSE may determine an optimal plan for the resource for performing the multiple activities within the project.

Finally, at act 1240, the dispatcher may identify any ticket for which a fixed responsible technician is applicable. For each such ticket, the dispatcher may populate the fixed resource so that 360 DSE will not attempt to allocate another resource to the activity.

Figure 13:
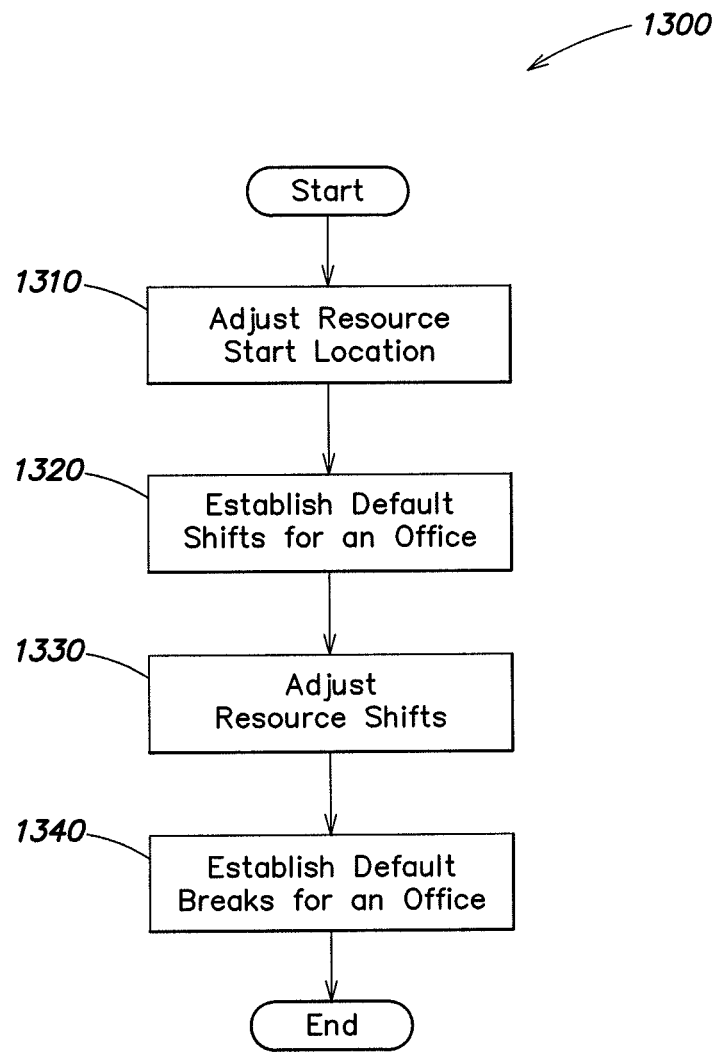
FIG. 13 shows an example for a process for adjusting the resource information provided to a dynamic scheduling engine, in accordance with some embodiments of the present invention.

Turning now to FIG. 13, examples of manual adjustments to resource information will now be discussed. Similar to the ticket adjustments, these resource adjustments may be performed as part of the process 500 as shown in FIG. 5 (e.g., within the fourth loop of the process 500).

The inventors have appreciated that, on a given day, each resource may begin the day's shift from a unique geographical starting location. That is, different resources may have different starting locations at the beginning of their shifts. Therefore, a better schedule may be obtained by providing these unique starting locations to 360 DSE.

Accordingly, at act 1310, the dispatcher may adjust the start location for each resource, either permanently or for a given day only. In some embodiments, the resource's residence address may be entered as a permanent start location for that resource. In some other embodiments, the resource may communicate a geographic location to the dispatcher the night before each shift, for example via an email, pager, telephone call, text message, etc. This location may be the resource's residence, a relative's residence, a friend's residence, etc., and may be used as the starting location for that resource on the following day. In yet some other embodiments, the resource's geographic location at the beginning and/or the end of a given day may be obtained via a GPS-enabled device. For example, GPS coordinates for the resource's vehicle may be automatically communicated to a dispatcher when the vehicle is turned off at the end of a day, and the location of the vehicle may be used as the starting location for the resource on the following day.

Returning to FIG. 13, the dispatcher may make other adjustments to resource information in addition to the start location. For example, at act 1320, the dispatcher may establish default shifts for a locate office, and, at act 1330, the dispatcher may adjust the shifts for each resource (e.g., in response to dynamically available information such as a resource calling in sick). Finally, at act 1340, the dispatcher may establish default breaks for a locate office.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Figure 14:
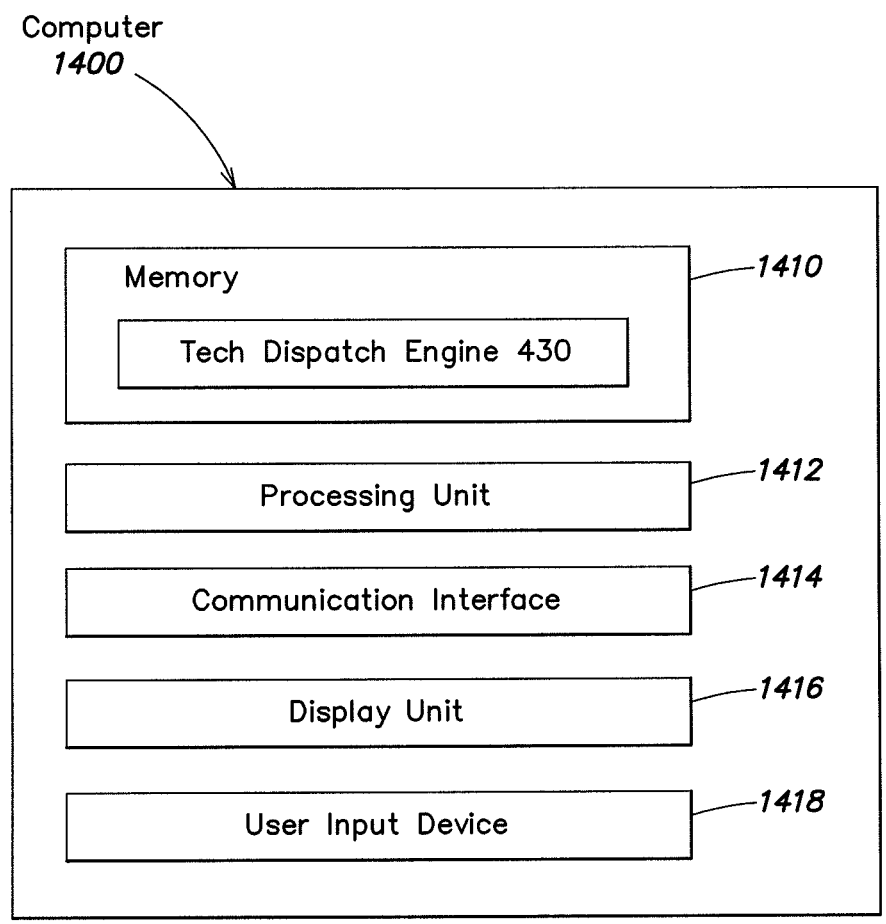
FIG. 14 shows an illustrative apparatus that may be used for dynamically dispatching field service technicians in accordance with some embodiments of the present invention.

FIG. 14 shows an illustrative computer 1400 that may be used at least in part to implement any of the "engines" described herein for dynamically dispatching field service technicians in accordance with some embodiments. For example, the computer 1400 comprises a memory 1410, one or more processing units 1412, one or more communication interfaces 1414, one or more display units 1416, and one or more user input devices 1418. The memory 1410 may comprise any computer-readable media, and may store computer instructions for implementing the tech dispatch engine 430 described above in connection with FIG. 4. The processing unit(s) 1412 may be used to execute the instructions implementing the tech dispatch engine 430. The communication interface(s) 1414 may be coupled to a wired or wireless network, bus, or other communication means and may therefore allow the computer 1400 to transmit communications to and/or receive communications from other devices. The display unit(s) 1416 may be provided, for example, to allow the human dispatcher 240 to view a schedule via the tech dispatch UI 460 described above in connection with FIG. 4. The user input device(s) 1418 may be provided, for example, to allow the human dispatcher 240 to make manual adjustments as described above in connection with FIGS. 12 and 13.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for dispatching a plurality of locate technicians to perform a plurality of locate activities, each locate activity corresponding to at least one locate ticket requesting that a presence or an absence of at least one underground facility be determined within a planned dig area, the system comprising:
    A) at least one first storage device for maintaining a ticket database;
    B) at least one second storage device for maintaining a technician database;
    C) at least one first processor programmed to implement a scheduling engine for:
        C1) allocating the plurality of locate technicians to the plurality of locate activities, and
        C2) scheduling the plurality of locate activities; and
    D) at least one second processor programmed to implement a dispatch engine for:
        D1) retrieving ticket information from the ticket database;
        D2) determining a performance deadline for a locate activity of the plurality of locate activities based at least in part on the ticket information retrieved from the ticket database;
        D3) retrieving technician information from the technician database, the technician information comprising shift information indicating availability of the plurality of locate technicians; and
        D4) providing inputs to the scheduling engine based at least in part on the ticket information and the technician information, comprising determining a latest start time for the locate activity, the latest start time based at least in part on the performance deadline for the locate activity, the performance deadline based at least in part on the ticket information, and the latest start time further based at least in part on the shift information, further comprising providing the latest start time to the scheduling engine in association with the locate activity, wherein:
    the at least one second processor provides inputs to the scheduling engine based at least in part on the ticket information, the technician information, and risk information associated with the locate activity;
    the at least one second processor is further programmed to determine at least two of job performance information, quality assessment information, weather information, traffic information, the risk information, penalty or profitability information, and complexity information associated with the locate activity;
    the at least one first processor is further programmed to provide optimized schedules with respect to a value metric;
    providing inputs to the scheduling engine further comprises assigning a base value to the locate activity; and
    the at least one second processor is further programmed to apply a weighting factor to the base value assigned to the locate activity based on the at least two of the job performance information, the quality assessment information, the weather information, the traffic information, the risk information, the penalty or profitability information, and the complexity information; and
    at least one of the base value and the weighting factor are based in part on at least two of contractual obligations, statutory and/or regulatory requirements, best practices, and standard operating procedures.

2. The system of claim 1, wherein the at least one first processor and the at least one second processor are a same processor.

3. The system of claim 1, wherein:
    providing inputs to the scheduling engine further comprises determining an earliest start time for the locate activity based at least in part on the ticket information; and
    the earliest start time and the latest start time for the locate activity fall on different calendar days.

4. The system of claim 3, wherein the earliest start time for the locate activity is determined based at least in part on a do-not-mark-before date obtained from the ticket information.

5. The system of claim 1, wherein:
    the at least one second processor is further programmed to retrieve ticket information from the ticket database repeatedly during a work day; and
    a time interval between any two consecutive retrievals is between 0 and 5 minutes.

6. The system of claim 1, wherein the at least one second processor provides inputs to the scheduling engine based at least in part on the ticket information, the technician information, and job performance information associated with the locate activity.

7. The system of claim 1, wherein the at least one second processor provides inputs to the scheduling engine based at least in part on the ticket information, the technician information, and quality assessment information associated with the locate activity.

8. The system of claim 1, wherein the at least one second processor provides inputs to the scheduling engine based at least in part on the ticket information, the technician information, and weather information associated with the locate activity.

9. The system of claim 1, wherein the at least one second processor provides inputs to the scheduling engine based at least in part on the ticket information, the technician information, and traffic information associated with the locate activity.

10. The system of claim 1, wherein the at least one second processor provides inputs to the scheduling engine based at least in part on the ticket information, the technician information, and penalty or profitability information associated with the locate activity.

11. The system of claim 1, wherein the at least one second processor provides inputs to the scheduling engine based at least in part on the ticket information, the technician information, and complexity information associated with the locate activity.

12. The system of claim 1, wherein the at least one second processor is further programmed to:
determine a service category for the locate activity based at least in part on the ticket information retrieved from the ticket database.

13. The system of claim 12, wherein the at least one second processor is further programmed to:
determine the service category for the locate activity at least in part by parsing the ticket information retrieved from the ticket database.

14. The system of claim 12, wherein the service category is any one of emergency, re-mark, or short notice.

15. The system of claim 12, wherein:
the at least one first processor is further programmed to provide optimized schedules with respect to the value metric; and
providing inputs to the scheduling engine further comprises assigning the base value to the locate activity based at least in part on the service category for the locate activity.

16. The system of claim 1, wherein the at least one second processor is further programmed to:
determine an underground facility type associated with the locate activity based at least in part on the ticket information retrieved from the ticket database.

17. The system of claim 16, wherein:
the at least one first processor is further programmed to provide optimized schedules with respect to the value metric; and
providing inputs to the scheduling engine further comprises assigning the base value to the locate activity based at least in part on the underground facility type associated with the locate activity.

18. The system of claim 16, wherein the at least one second processor is further programmed to:
determine whether the underground facility type associated with the locate activity is a high profile facility type; and
apply the weighting factor to the base value assigned to the locate activity if it is determined that the underground facility type associated with the locate activity is a high profile facility type.

19. The system of claim 1, wherein the at least one second processor is further programmed to present a user interface for displaying schedule information to a human dispatcher and for receiving manual adjustments from the human dispatcher.

20. The system of claim 19, wherein the at least one second processor is further programmed to transmit schedule information to a remote user interface for displaying the schedule information to at least one supervisor of the plurality of locate technicians.

21. The system of claim 19, wherein the at least one second processor is further programmed to:
display two or more locate activities in a Gantt chart format via the user interface;
determine a performance deadline for each of the displayed locate activities; and
apply different visual indicators to the displayed locate activities depending on the performance deadlines of the displayed locate activities.

22. The system of claim 21, wherein an alert indicator is applied to a locate activity with a missed performance deadline.

23. A method for dispatching a plurality of locate technicians to perform a plurality of locate activities, each locate activity corresponding to at least one locate ticket requesting that a presence or an absence of at least one underground facility be determined within a planned dig area, the method comprising:
A) retrieving technician information from a technician database maintained on at least one first storage device, the technician information comprising shift information indicating availability of the plurality of locate technicians;
B) providing first inputs to a scheduling engine based at least in part on the technician information;
C) retrieving ticket information from a ticket database maintained on at least one second storage device;
D) determining, by the scheduling engine, a performance deadline for a locate activity of the plurality of locate activities based at least in part on the ticket information;
E) providing second inputs to the scheduling engine based at least in part on the ticket information and the technician information, comprising determining a latest start time for the locate activity, the latest start time based at least in part on the performance deadline for the locate activity, the performance deadline based at least in part on the ticket information, and the latest start time further based at least in part on the shift information;
F) selecting, by the scheduling engine, a start time for the locate activity based at least in part on the first and second inputs;
G) allocating, by the scheduling engine, at least one locate technician to perform the locate activity; and
H) sending, by the scheduling engine, an instruction to dispatch the at least one locate technician to perform the locate activity,
wherein E) comprises providing the second inputs to the scheduling engine based at least in part on the ticket information, the technician information, and risk information associated with the locate activity;
further comprising:
determining at least two of job performance information, quality assessment information, weather information, traffic information, risk information, penalty or profitability information and complexity information associated with the locate activity,
wherein:
the scheduling engine is adapted to provide optimized schedules with respect to a value metric;
providing second inputs to the scheduling engine further comprises assigning a base value to the locate activity, and applying a weighting factor to the base value assigned to the located activity based on the at least two of the job performance information, the quality assessment information, the weather information, the traffic information, the risk information, the penalty or profitability information and the complexity information; and
at least one of the base value and the weighting factor are based in part on at least two of contractual obligations, statutory and/or regulatory requirements, best practices, and standard operating procedures.

24. The method of claim 23, wherein retrieving ticket information comprises:
identifying new tickets that have been added to the ticket database since a previous retrieval; and
retrieving the new tickets from the ticket database.

25. The method of claim 23, wherein E) comprises providing the second inputs to the scheduling engine based at least in part on the ticket information, the technician information, and job performance information associated with the locate activity.

26. The method of claim 23, wherein E) comprises providing the second inputs to the scheduling engine based at least in part on the ticket information, the technician information, and quality assessment information associated with the locate activity.

27. The method of claim 23, wherein E) comprises providing the second inputs to the scheduling engine based at least in part on the ticket information, the technician information, and weather information associated with the locate activity.

28. The method of claim 23, wherein E) comprises providing the second inputs to the scheduling engine based at least in part on the ticket information, the technician information, and traffic information associated with the locate activity.

29. The method of claim 23, wherein E) comprises providing the second inputs to the scheduling engine based at least in part on the ticket information, the technician information, and penalty or profitability information associated with the locate activity.

30. The method of claim 23, wherein E) comprises providing the second inputs to the scheduling engine based at least in part on the ticket information, the technician information, and complexity information associated with the locate activity.

31. The method of claim 23, further comprising;
applying one or more ticket exclusion criteria to at least one new ticket to determine whether the at least one new ticket is suitable for automatic scheduling.

32. The method of claim 31, wherein:
the one or more ticket exclusion criteria comprises a geofence exclusion that defines a geographical exclusion area; and
the at least one new ticket is excluded from automatic scheduling if a ticket location associated with the at least one new ticket falls within the geographical exclusion area.

33. The method of claim 31, wherein:
the one or more ticket exclusion criteria comprises a geofence exclusion that defines a geographical exclusion area and is associated with at least one exclusion time period; and
the at least one new ticket is excluded from automatic scheduling if a ticket location associated with the at least one new ticket falls within the geographical exclusion area and a performance time window of the at least one new ticket overlaps at least partially with the at least one exclusion time period, the performance time window being determined by an earliest start time and a performance deadline associated with the at least one new ticket.

34. The method of claim 23, wherein providing second inputs to the scheduling engine further comprises estimating an expected duration for the locate activity based at least in part on the ticket information.

35. The method of claim 34, wherein estimating an expected duration for the locate activity comprises:
determining a facility type to be located during the locate activity;
determining the expected duration for the locate activity based at least in part on the facility type.

36. The method of claim 23, wherein:
the scheduling engine is adapted to provide optimized schedules with respect to the value metric; and
providing second inputs to the scheduling engine further comprises assigning the base value to the locate activity.

37. The method of claim 36, wherein assigning the base value to the locate activity comprises:
determining a facility type to be located during the locate activity; and
determining the base value for the locate activity based at least in part on the facility type.

38. The method of claim 37, wherein assigning the base value to the locate activity further comprises:
determining a service category associated with the locate activity; and
applying the weighting factor to the base value based at least in part on the service category.

39. The method of claim 23, further comprising:
receiving at least one input instruction from a human dispatcher via a user interface; and
providing third inputs to the scheduling engine based at least in part on the at least one input instruction received from the human dispatcher.

40. The method of claim 39, wherein the at least one input instruction from the human dispatcher comprises an instruction to modify availability of a locate technician of the plurality of locate technicians.

41. The method of claim 39, wherein the at least one input instruction from the human dispatcher comprises an instruction to modify a start location of a locate technician of the plurality of locate technicians.

42. The method of claim 39, wherein the at least one input instruction from the human dispatcher comprises an instruction to allocate a selected locate technician of the plurality of locate technicians to a selected locate activity of the plurality of locate activities.

43. The method of claim 39, wherein the at least one input instruction from the human dispatcher comprises an instruction to allocate a selected locate technician of the plurality of locate technicians to a project ticket comprising two or more related locate activities.

44. The method of claim 23, further comprising transmitting schedule information generated by the scheduling engine to a remote user interface for displaying the schedule information to at least one supervisor of the plurality of locate technicians.

45. At least one non-transient computer-readable storage medium encoded with instructions that, when executed by at least one processor, perform a method for scheduling dispatch a plurality of locate technicians to perform a plurality of locate activities, each locate activity corresponding to at least one locate ticket requesting that a presence or absence of at least one underground facility be determined within a planned dig area, the method comprising:
A) retrieving technician information from a technician database maintained on at least one first storage device, the technician information comprising shift information indicating availability of the plurality of locate technicians;
B) providing first inputs to a scheduling engine based at least in part on the technician information;
C) retrieving ticket information from a ticket database maintained on at least one second storage device;

D) determining a performance deadline for a locate activity of the plurality of locate activities based at least in part on the ticket information; and
E) providing second inputs to a scheduling engine based at least in part on the ticket information and the technician information, comprising determining a latest start time for the locate activity, the latest start time based at least in part on the performance deadline for the locate activity, the performance deadline based at least in part on the ticket information, and the latest start time further based at least in part on the shift information, wherein E) comprises:

providing the second inputs to the scheduling engine based at least in part on the ticket information, the technician information, and risk information associated with the locate activity;

determining at least two of job performance information, quality assessment information, weather information, traffic information, the risk information, penalty or profitability information, and complexity information associated with the locate activity;

providing optimized schedules with respect to a value metric;

providing inputs to the scheduling engine further comprises assigning a base value to the locate activity; and applying a weighting factor to the base value assigned to the locate activity based on the at least two of the job performance information, the quality assessment information, the weather information, the traffic information, the risk information, the penalty or profitability information, and the complexity information; and at least one of the base value and the weighting factor are based in part on at least two of contractual obligations, statutory and/or regulatory requirements, best practices, and standard operating procedures.

* * * * *